(12) United States Patent
Masuda et al.

(10) Patent No.: US 6,586,943 B1
(45) Date of Patent: Jul. 1, 2003

(54) SENSOR SIGNAL PROCESSING APPARATUS

(75) Inventors: Takashi Masuda, Tokyo (JP); Yasuhide Yoshikawa, Tokyo (JP)

(73) Assignee: Yamatake Corporation, Tokyo (JP)

( * ) Notice: Subject to any disclaimer, the term of this patent is extended or adjusted under 35 U.S.C. 154(b) by 39 days.

(21) Appl. No.: 09/626,128

(22) Filed: Jul. 26, 2000

(30) Foreign Application Priority Data

Jul. 26, 1999 (JP) .......................................... 11-210471

(51) Int. Cl.$^7$ ........................ G01R 31/00; G01P 15/125; H03K 19/01; G06F 11/00
(52) U.S. Cl. ..................... 324/500; 324/658; 324/158.1; 73/514.32; 73/718; 326/17; 702/183
(58) Field of Search ......................... 324/526, 658–678, 324/500; 73/700–718, 514.32; 326/17; 702/183

(56) References Cited

U.S. PATENT DOCUMENTS

| 5,083,091 A | * | 1/1992 | Frick et al. ................. 324/678 |
| 5,337,353 A | * | 8/1994 | Boie et al. ................. 379/388 |
| 5,424,650 A | * | 6/1995 | Frick ........................... 324/688 |
| 5,661,240 A | * | 8/1997 | Kemp ....................... 73/514.32 |
| 6,356,085 B1 | * | 3/2002 | Ryat et al. ................. 324/658 |

FOREIGN PATENT DOCUMENTS

| GB | 2 080 549 A | * | 2/1982 | ........... G01R/27/26 |
| JP | 2-302628 | | 12/1990 | |
| JP | 5-346357 | | 12/1993 | |

OTHER PUBLICATIONS

"A High–Sensitivity Integrated–Circuit Capacitive Pressure Transducer" IEEE Transactions on Electron Devices, vol. ED–29, No. 1, Jan. 1982, pp. 48–56.

"Study of the Sensitivity in an Automatic Capacitance Measurement System" IEEE Instrumentation and Measurement Technology Conference, pp. 329–334, 1997.

"Non–Differential Integrated Atofarad Capacitor Measurement System" IEEE Instrumentation and Measurements Technology Conference, pp. 884–886, 1997.

"An Illimination Technique of Temperature and Humidity Effect in High Precision Capacitance Based Pressure Transducers" SICE pp. 393–394, 1999 (Jul.).

* cited by examiner

Primary Examiner—Ernest Karlsen
Assistant Examiner—Paresh Patel
(74) Attorney, Agent, or Firm—Blakely, Sokoloff, Taylor & Zafman

(57) ABSTRACT

A sensor signal processing apparatus includes a sensor section, power supply section, switching section, and CPU. The characteristics of the sensor section change in accordance with a change in physical quantity to be measured. The power supply section supplies powers of two systems having different polarities to the sensor section. The switching section is connected between the power supply section and the sensor section to switch combinations of powers of the two systems from the power supply section while preventing mixing of powers of the two systems. The CPU obtains the ratio between the differences between a plurality of signals output from the sensor section for every switching operation of the switching section.

16 Claims, 15 Drawing Sheets

SENSOR SIGNAL PROCESSING APPARATUS

BACKGROUND OF THE INVENTION

The present invention relates to a sensor signal processing apparatus for extracting a signal from a sensor section as a function of physical quantity to be measured and, more particularly, to a sensor signal processing circuit for eliminating errors originating from elements due to temperature changes and the like (these errors will be referred to as element-based errors hereinafter) and errors originating from a circuit due to the offset of an operational amplifier and the like (these errors will be referred to as circuit-based errors hereinafter) by signal processing.

Recently, in the field of pressure measurements, electronic pressure gages have been rapidly replacing mechanical pressure gages. The electronic pressure gages can be roughly classified into a resistance type that converts a pressure change in a pressure-sensitive diaphragm into an electric resistance change and a capacitance type that converts a displacement of a pressure-sensitive diaphragm into a capacitance change. Of these types of sensors, a capacitance type pressure sensor is excellent at fine pressure measurement.

FIG. 16 shows the structure of the above capacitance type pressure sensor. Referring to FIG. 16, a first recess portion 101a is formed in the central portion of the surface of a pedestal substrate 101. A second recess portion 101b is formed in the shape of a groove to surround the first recess portion 101a through a barrier 104. A thin diaphragm substrate 102 is joined to that surface of the pedestal substrate 101 on which the recess portions 101a and 101b are formed. The spaces surrounded by the first and second recess portions 101a and 101b and diaphragm substrate 102 on the pedestral substrate 101 form capacitor chambers 103a and 103b.

As shown in FIG. 17, a square fixed electrode 105a is formed on the bottom surface of the first recess portion 101a. A movable electrode 105b is formed on the diaphragm substrate 102 to oppose the fixed electrode 105a at a predetermined distance therefrom. The electrode 105a is extracted to the outside by a lead 105c. The electrode 105b is also extracted to the outside by a lead (not shown). A sensor capacitor 114a (FIG. 18) to be described later is constituted by the pair of electrodes 105a and 105b and the air existing between the electrodes 105a and 105b and serving as a dielectric member.

As shown in FIG. 17, a belt-like electrode 106a is formed in the shape of a square frame on the bottom surface of the second recess portion 101b. An electrode 106b is formed on the diaphragm substrate 102 to oppose the electrode 106a at a predetermined distance therefrom. The electrode 106a is extracted to the outside by a lead 106c. The electrode 106b is also extracted to the outside by a lead (not shown). A reference capacitor 114b (FIG. 18) to be described later is constituted by the pair of electrodes 106a and 106b and the air existing between the electrodes 106a and 106b and serving as a dielectric member.

Note that the barrier 104 between the capacitor chambers 103a and 103b is partly removed to allow the air in the capacitor chambers 103a and 103b to easily mix.

A portion of the diaphragm substrate 102 which is part of the capacitor chamber 103a serves as a pressure-sensitive diaphragm 102a. As shown in FIG. 16, therefore, when a positive pressure P is externally applied to the diaphragm substrate 102, the pressure-sensitive diaphragm 102a deflects toward the capacitor chamber 103a. Since the electrode 105b is displaced as the pressure-sensitive diaphragm 102a deflects, the gap between the electrodes 105a and 105b decreases, and a capacitance $C_s$ of the sensor capacitor 114a increases. At this time, a portion of the diaphragm substrate 102 which is part of the capacitor chamber 103b does not deflect upon application of the pressure P, and hence a capacitance $C_r$ of the reference capacitor 114b does not change. That is, the sensor capacitor 114a functions as a first sensor element whose capacitance $C_s$ changes in accordance with a change in the pressure P.

That portion of the diaphragm substrate 102 which is part of the capacitor chamber 103b does not deflect upon application of the pressure P because the capacitor chamber 103b is narrow. For this reason, the capacitance $C_r$ of the reference capacitor 114b does not change. That is, the reference capacitor 114b functions as a second sensor that exhibits the constant capacitance $C_r$ even with a change in the pressure P.

The reference capacitor 114b is formed to eliminate measurement errors (element-based errors) due to temperature changes around a sensor section 114, humidity changes in the capacitor chamber 103a, and the like. More specifically, the pressure P from which the above measurement errors are eliminated can be theoretically obtained by calculating $$K_1 = (C_s - C_r)/C_s \quad (1)$$

on the basis of the capacitance $C_s$ of the sensor capacitor 114a and the capacitance $C_r$ of the reference capacitor 114b.

Letting $\in$ be the dielectric constant of the air in the capacitor chambers 103a and 103b, d be the gap between the electrodes 105a and 105b in the sensor capacitor 114a (in non-measurement period) and the gap between the electrodes 106a and 106b in the reference capacitor 114b, Δd be the pressure sensitivity displacement of the pressure-sensitive diaphragm 102a, and S be the area of each of the opposing surfaces of the electrodes 105a and 105b and the areas of the opposing surfaces of the electrodes 106a and 106b for the sake of simplicity, the capacitances $C_s$ and $C_r$ can be given by $$C_s = \in S/(d+\Delta d) \quad (2)$$

$$C_r = \in S/d \quad (3)$$

Substitutions of equations (2) and (3) into equation (1) yield $$K_1 = -\Delta d/d \quad (4)$$

Obviously, therefore, the pressure P can be obtained from equation (1).

FIG. 18 shows a sensor signal processing circuit for extracting a signal from the sensor section 114 in FIG. 16 as a function of the pressure P.

Referring to FIG. 18, the input side of the sensor capacitor 114a of the sensor section 114 is connected to an AC power supply 111 through a buffer 113a and switching section 112. The input side of the reference capacitor 114b is connected to the AC power supply 111 through a buffer 113b and the switching section 112. An amplifying section 115 is connected to the output side of the sensor section 114. A CPU (Central Processing Unit) 117 is connected to the output side of the amplifying section 115 through an A/D (Analog-to-Digital) converter 116.

The amplifying section 115 is comprised of an operational amplifier 115a and capacitor 115b. The noninverting input terminal (+), inverting input terminal (−), and output terminal of the operational amplifier 115a are respectively connected to the ground (G), a node 114c of the capacitors 114a and 114b, and the A/D converter 116. The capacitor 115b is connected to the node 114c of the capacitors 114a and 114b and the output terminal of the operational amplifier 115a.

The CPU 117 outputs control signals 118 for switching operation to the switching section 112, and performs arithmetic processing upon combining signals output from the A/D converter 116 for every switching operation of the switching section 112.

Letting $V_i$ be the output voltage from the AC power supply 111, and $C_f$ be the capacitance of the capacitor 115b, an output voltage $V_{101}$ from the amplifying section 115 when the power supply 111 is connected to the sensor capacitor 114a can be given by $$V_{101} = -C_s V_i / C_f \quad (5)$$

An output voltage $V_{102}$ from the amplifying section 115 when the power supply 111 is connected to the reference capacitor 114b can be given by $$V_{102} = -C_r V_i / C_f \quad (6)$$

Therefore, $K_I$ expressed by equation (1) can be obtained by using equation (7) below:

$$(V_{101} - V_{102})/V_{101} = (C_s - C_r)/C_s = K_1 \quad (7)$$

In the signal processing circuit shown in FIG. 18, however, the relations expressed by equations (5) and (6) cannot be properly obtained because of wiring capacitances, offsets of the buffers 113a and 113b and operational amplifier 115a, and the like. More specifically, letting $e_{101}$, $e_{102}$, and $e_{103}$ be errors based on the offsets of the buffers 113a and 113b and operational amplifier 115a, the output voltages $V_{101}$ and $V_{102}$ from the amplifying section 115 are given by $$V_{101} = -C_s(V_i + e_{101})/C_f + e_{103} \quad (5a)$$

$$V_{102} = -C_r(V_i + e_{102})/C_f + e_{103} \quad (6a)$$

As indicated by equations (5a) and (6a), the errors $e_{101}$ to $e_{103}$ cannot be eliminated. The same applies to wiring capacitances. For this reason, only measurement results containing circuit-based errors can be obtained.

In addition, in the conventional sensor signal processing circuit, since equation (1) cannot be obtained from equations (5a) and (6a), element-based errors due to temperature changes and the like cannot be eliminated.

According to the conventional sensor signal processing circuit, therefore, an accurate, high-precision measurement result cannot be obtained because both circuit- and element-based errors are contained in the result.

SUMMARY OF THE INVENTION

It is an object of the present invention to provide a sensor signal processing apparatus designed to improve the measurement precision of a sensor.

In order to achieve the above object, according to the present invention, there is provided a sensor signal processing apparatus comprising sensor means whose characteristics change in accordance with a change in physical quantity to be measured, power supply means for supplying powers of two systems having different polarities to the sensor means, switching means, connected between the power supply means and the sensor means, for switching combinations of powers of the two systems from the power supply means while preventing mixing of powers of the two systems, and arithmetic means for obtaining a ratio between differences between a plurality of signals output from the sensor means for every switching operation of the switching means.

DESCRIPTION OF THE PREFERRED EMBODIMENT

The present invention will be described in detail below with reference to the accompanying drawings.

(First Embodiment)

Figure 1:
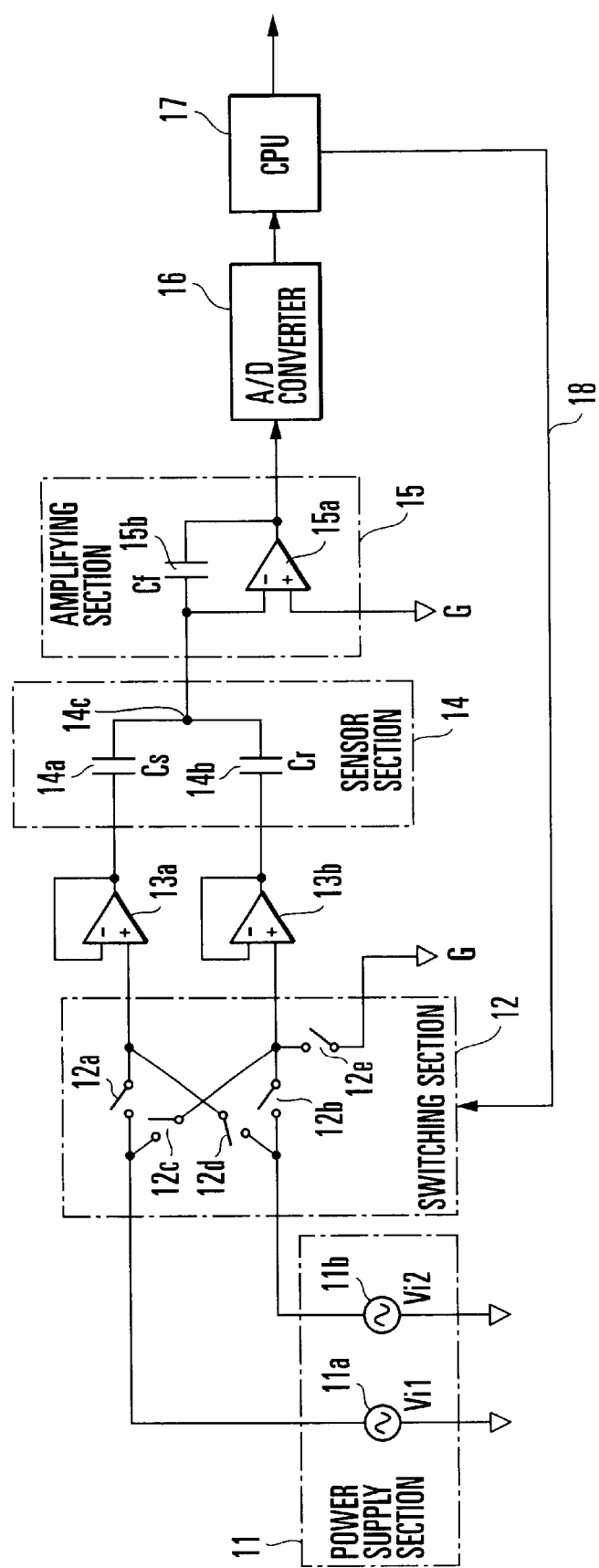
FIG. 1 is a circuit diagram showing a sensor signal processing circuit according to the first embodiment of the present invention which is applied to the pressure sensor shown in FIGS. 16 and 17.
Figure 16:
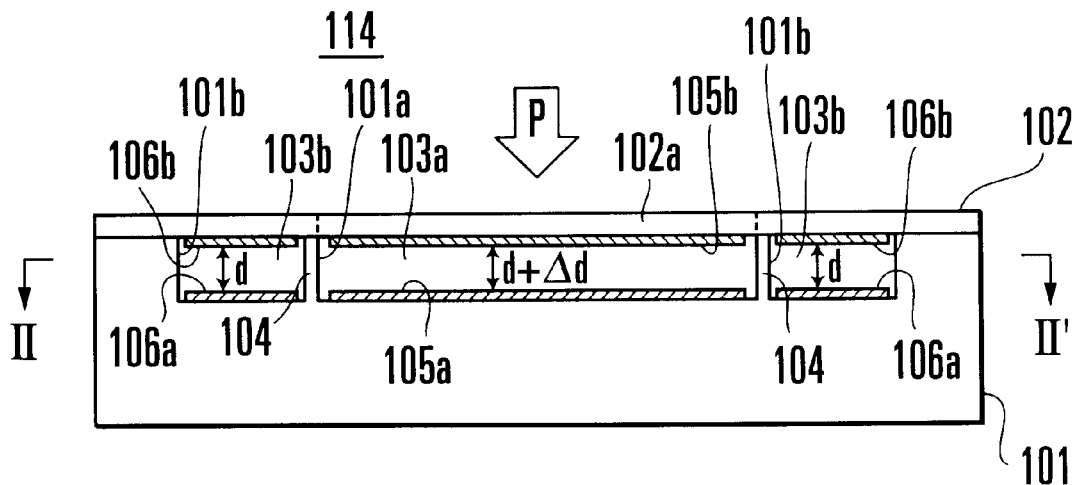
FIG. 16 is a sectional view of a capacitance type pressure sensor to which pressures are applied from one direction.
Figure 17:
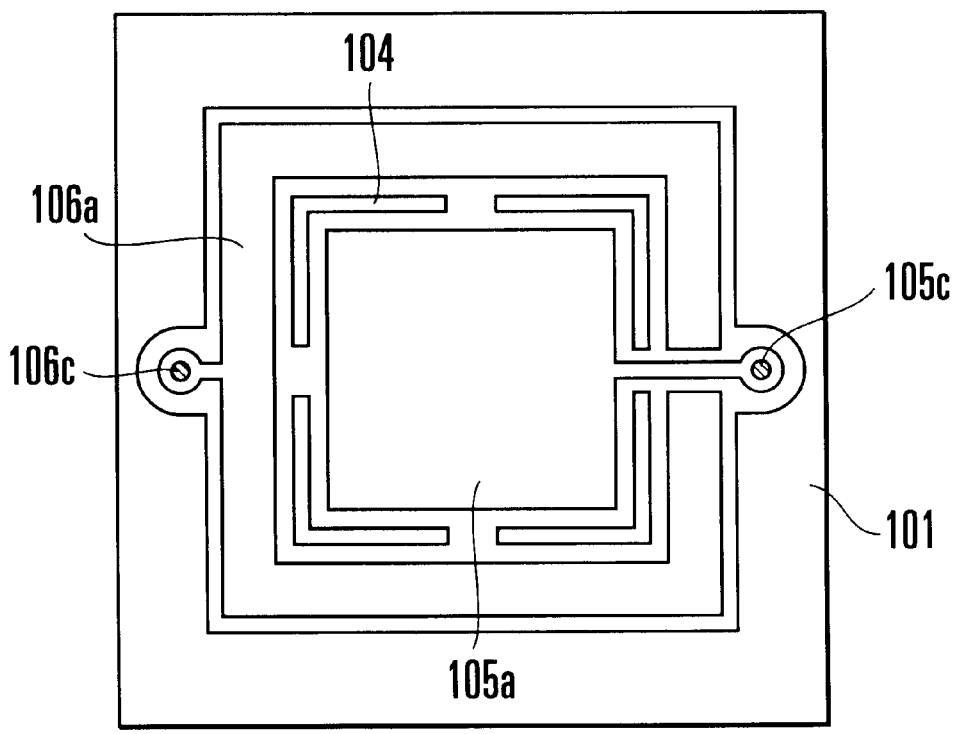
FIG. 17 is a sectional view taken along a line II–II' of a sensor section in FIG. 16.

FIG. 1 shows a sensor signal processing circuit according to the first embodiment of the present invention, which is applied to the capacitance type pressure sensor shown in FIGS. 16 and 17.

In the sensor signal processing circuit shown in FIG. 1, a power supply section 11 is comprised of AC power supplies 11a and 11b of two systems having different polarities. A sensor section 14 (corresponding to the sensor section 114 in FIG. 16) is comprised of a reference capacitor 14b (corresponding to the reference capacitor 114b in FIG. 18). Both capacitors 14a and 14b have temperature and humidity characteristics, which will be described later.

A switching section 12 is placed between the output side of the power supply section 11 and the input side of the sensor section 14. The switching section 12 includes a switch 12a for connecting the power supply 11a to the sensor capacitor 14a, a switch 12b for connecting the power supply 11b to the reference capacitor 14b, a switch 12c for connecting the power supply 11a to the reference capacitor 14b, a switch 12d for connecting the power supply 11b to the sensor capacitor 14a, and a switch 12e for connecting the input side of the reference capacitor 14b to the ground (G). The switches 12a to 12d constitute a 2-input/2-output bridge.

Buffers 13a and 13b are connected between the switching section 12 and the sensor section 14. The buffers 13a and 13b eliminate errors based on slight ON resistances produced when the switches 12a to 12d of the switching section 12 are ON. If, therefore, the switches 12a to 12d are ideal switches, and their ON resistances are negligibly low, the buffers 13a and 13b are not required.

An amplifying section 15 for amplifying and outputting an output signal from the sensor section 14 is connected to the output side of the sensor section 14. A CPU 17 functioning as an arithmetic section is connected to the output side of the amplifying section 15 through an A/D converter 16.

The amplifying section 15 is comprised of an operational amplifier 15a and capacitor 15b. The noninverting input terminal (+), inverting input terminal (−), and output terminal of the operational amplifier 15a are respectively connected to the ground (G), a node 14c of the reference capacitors 14a and 14b, and the A/D converter 16. The capacitor 15b is connected between the node 14c of the capacitors 14a and 14b and the output terminal of the operational amplifier 15a. Note that a resistor may be used in place of the capacitor 15b.

The CPU 17 outputs control signals 18 for switching connection between the power supply section 11 and the sensor section 14 to the switching section 12, and performs arithmetic processing with a combination of a plurality of signals output from the A/D converter 16 every time the switching section 12 performs switching operation.

The control signals 18 from the CPU 17 are used to switch connection between the power supply section 11 and the sensor section 14 in four ways within a short period of time. However, any combinations which mix outputs from the AC power supplies 11a and 11b of the two systems should be inhibited. More specifically, the following combinations are inhibited: the combination of switches 12a and 12d of the switching section 12, which connect the two AC power supplies 11a and 11b to the sensor capacitor 14a when turned on, and the combination of switches 12b and 12c, which connect the two AC supplies 11a and 11b to the reference capacitor 14b when turned on.

In the arithmetic processing performed by the CPU 17, upon calculating the first difference between the first and second signals, of the first to fourth signals sequentially input for every switching operation of the switching section 12, and the second difference between the third and fourth signals, the CPU 17 calculates the ratio between the first and second differences, thereby obtaining a physical quantity for the acquisition of a pressure P.

Figure 18:
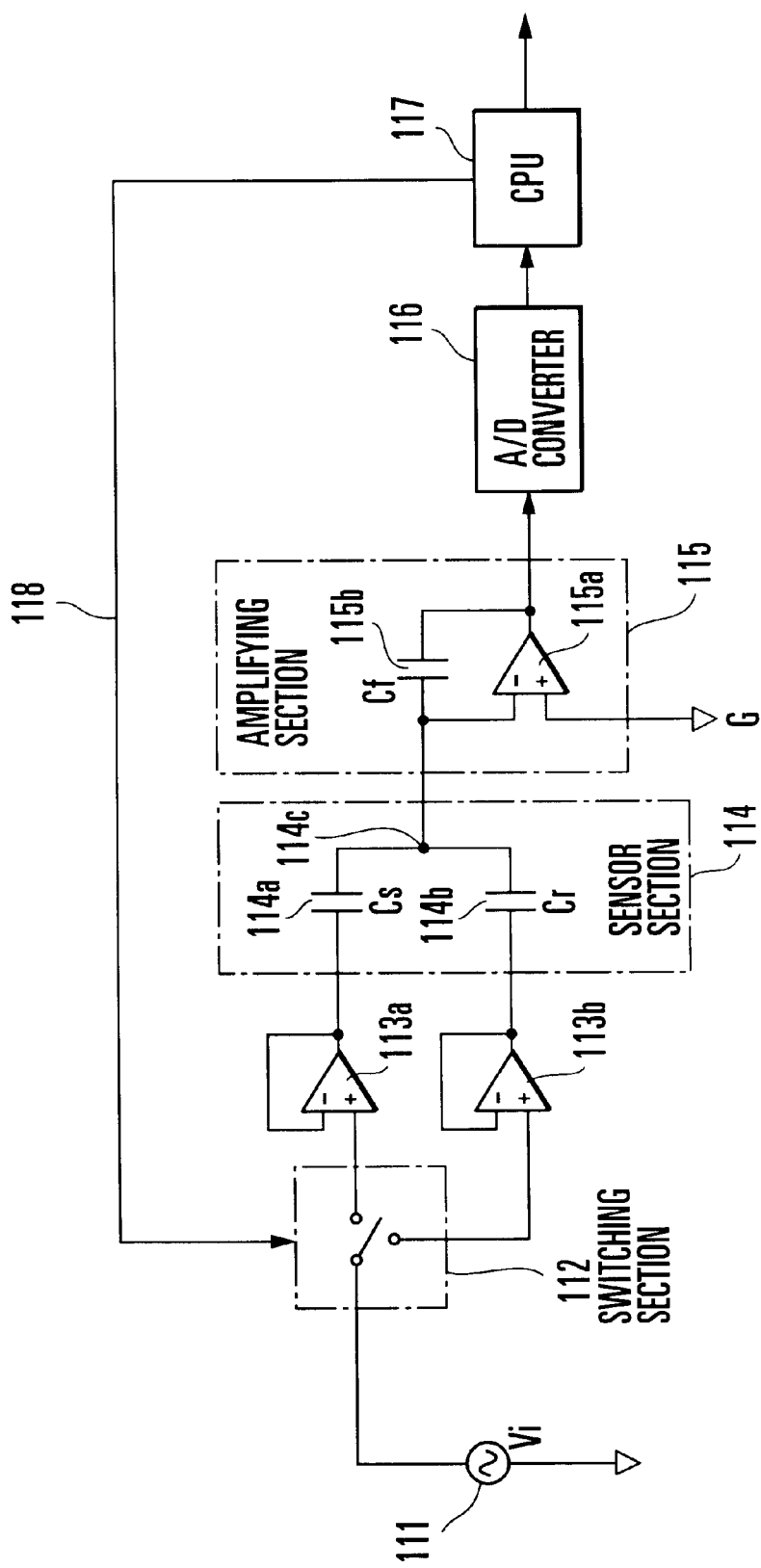
FIG. 18 is a circuit diagram showing a conventional sensor signal processing circuit which is applied to the pressure sensor shown in FIGS. 16 and 17.

In the conventional sensor signal processing circuit shown in FIG. 18, there are error factors such as wiring capacitances and offsets of the buffers 113a and 113b and operational amplifier 115a. This applies to the sensor signal processing circuit shown in FIG. 1. According to the sensor signal processing circuit of this embodiment, however, since error factors can be eliminated by signal processing as described above, a measurement result without any circuit-based errors can be obtained.

Assume that the errors based on the offsets of the buffers 13a and 13b and operational amplifier 15a are represented by $e_1$, $e_2$, and $e_3$, respectively. The principle of eliminating these errors will be described. Let $V_{i1}$, and $V_{i2}$ be output voltages from the power supplies 11a and 11b of the power supply section 11, and $C_f$ be the capacitance of the capacitor 15b of the amplifying section 15.

First of all, the CPU 17 sequentially outputs signals s1 to s4 as control signals within a short period of time. These signals are used to ON/OFF-control the switches 12a to 12e of the switching section 12 in the manner indicated by Table 1. In this case, the noninverting input terminal (+) of the buffer 13b is connected to ground by turning on the switch 12e using the signals s3 and s4. This prevents the noninverting input terminal (+) of the buffer 13b from floating.

TABLE 1

|  | Switch 12a | Switch 12b | Switch 12c | Switch 12d | Switch 12e |
| --- | --- | --- | --- | --- | --- |
| Signal s1 | on | on | off | off | off |
| Signal s2 | off | off | on | on | off |
| Signal s3 | on | off | off | off | on |
| Signal s4 | off | off | off | on | on |

When the signals s1 to s4 are supplied to the switching section 12, outputs voltages $V_1$ to $V_4$ from the amplifying section 15 can be expressed as follows:

$$V_1 = -[C_s(V_{i1}+e_1)+C_r(V_{i2}+e_2)]/C_f + e_3 \quad (8)$$

$$V_2 = -[C_s(V_{i2}+e_1)+C_r(V_{i1}+e_2)]/C_f + e_3 \quad (9)$$

$$V_3 = -C_s(V_{i1}+e_1)/C_f + e_3 \quad (10)$$

$$V_4 = -C_s(V_{i2}+e_1)/C_f + e_3 \quad (11)$$

$(V_1-V_2)/(V_3-V_4)$ is calculated from equations (8) to (11) as follows $$(V_1-V_2)/(V_3-V_4) = (C_s V_{i1}+C_r V_{i2}-C_s V_{i2}-C_r V_{i1})/(C_s V_{i1}-C_s V_{i2}) \quad (12)$$

Thus, the errors $e_1$ to $e_3$ can be eliminated.

The output voltages $V_{i1}$ and $V_{i2}$ from the AC power supplies 11a and 11b preferably have the relationship expressed by $$V_{i1}=-V_{i2} \tag{13}$$

However, voltage fluctuations may occur, and hence $$V_{i1}=-\alpha V_{i2} \tag{14}$$

where $\alpha$ ($\alpha>0$) is an error coefficient.

A substitution of equation (14) into equation (12) yields $$(V_1-V_2)/(V_3-V_4)=(C_s-C_r)/C_s(=K_1) \tag{15}$$

Thus, equation (1) can be obtained. Obviously, in equation (15), the error coefficient $\alpha$ is eliminated, and hence the measurement result contains no error due to voltage variations.

Although the above description exemplifies the case of the errors $e_1$ to $e_3$ due to the offsets of the buffers 13a and 13b and operational amplifier 15a, other error factors such as wiring capacitances can also be eliminated by the same principle. In addition, even if a circuit (not shown) is incorporated in the sensor signal processing circuit shown in FIG. 1, errors due the incorporated circuit can also be eliminated.

As described above, four combinations of outputs from the power supplies 11a and 11b of the two systems are supplied to the sensor section 14, and the ratio between the differences among four signals output from the sensor section 14 upon switching of the respective combinations is obtained, thereby eliminating circuit-based errors due to offsets and the like from the measurement result. This method will be referred to as a fourth-quadrant ratio metric method.

Although both the sensor capacitor 14a and reference capacitor 14b have temperature and humidity characteristics, element-based errors due to these characteristics can be eliminated from the measurement result.

The temperature characteristics of the capacitors 14a and 14b will be described first. The temperature characteristics of the capacitors 14a and 14b mainly originate from the thermal expansion of a pedestral substrate 101 and diaphragm substrate 102 (FIG. 16). Although the planar shapes of the substrates 101 and 102 are square, they may be circular. If, therefore, the sensor capacitor 14a is approximated by a slight flexure scheme for a disk, a perimeter of which is perfectly fixed, the temperature characteristics of a capacitance $C_s$ can be given by $$C_s = \pi\varepsilon\sqrt{-\frac{16Et^3}{3dP(v^2-1)}}\arctan h\sqrt{\frac{3Pr^4(v^2-1)}{16Edt^3}} \tag{16}$$

In addition, assuming that the pressure sensitivity of the reference capacitor 14b is zero, the temperature characteristics of a capacitance $C_r$ is given by $$C_r=\varepsilon\pi r^2/d \tag{17}$$

In equations (16) and (17), a pressure P and Poisson's ratio v are parameters having no temperature characteristics, and a dielectric constant $\in$, Young's modulus E, thickness t and radius r (FIG. 16) of a pressure-sensitive diaphragm 102a, and gap d between electrodes 105a and 105b are parameters having temperature characteristics due to thermal expansion and the like.

Letting $\Delta T$ be a temperature change from a reference temperature, the thermal expansion coefficients of the substrates 1 and 2 can be expressed as $f(\Delta T)$. If this thermal expansion coefficient is introduced into parameters having temperature characteristics, equations (18) to (20) can be obtained. Assume that the substrate material has no crystal anisotropy.

$$t=t_0[1+f(\Delta T)] \tag{18}$$

$$r=r_0[1+f(\Delta T)] \tag{19}$$

$$d=d_0[1+f(\Delta T)] \tag{20}$$

In equations (18) to (20), $t_0$, $r_0$, and $d_0$ are the thickness and radius of the pressure-sensitive diaphragm 102a and the gap between the electrodes 105a and 105b, respectively, at a reference temperature.

If equations (18) to (20) are substituted into equations (16) and (17), and further substituted into equation (1) to obtain temperature characteristics, equation (21) can be obtained.

$$K_1=1-\beta/\text{arc tan } h(\beta) \tag{21}$$

where $$\beta=[3Pr_0^4(v^2-1)/(16Ed_0t_0^3)]^{1/2} \tag{22}$$

As is obvious from equations (21) and (22), all the parameters having temperature characteristics, other than Young's modulus E, are eliminated. In addition, since the Young's modulus E exerts little influence, errors due to temperature changes can be approximately eliminated from the measurement result by solving equation (1).

The humidity characteristics of the capacitors 14a and 14b will be described next. The humidity characteristics of the capacitors 14a and 14b mainly originate from changes in dielectric constant $\in$ in capacitor chambers 103a and 103b with changes in humidity. As is obvious from equations (21) and (22), however, since the dielectric constant $\in$ is eliminated by solving equation (1), errors due to humidity changes are eliminated from the measurement result.

As described above, according to the sensor signal processing circuit of this embodiment, all circuit-based errors can be eliminated from a measurement result by calculating $(V_1-V_2)/(V_3-V_4)$ with respect to $V_1$ to $V_4$ upon A/D conversion. In addition, since equation (1) can be obtained by calculating $(V_1-V_2)/(V_3-V_4)$, element-based errors due to temperature changes, humidity changes, and the like can be eliminated. As a consequence, an accurate, high-precision measurement result without any circuit-based errors and element-based errors can be obtained.

In the above embodiment, the CPU 17 computes $(V_1-V_2)/(V_3-V_4)$. However, the above calculation may be performed by analog arithmetic operation or another digital arithmetic circuit that does not use the CPU 17.

(Second Embodiment)

Figure 2:
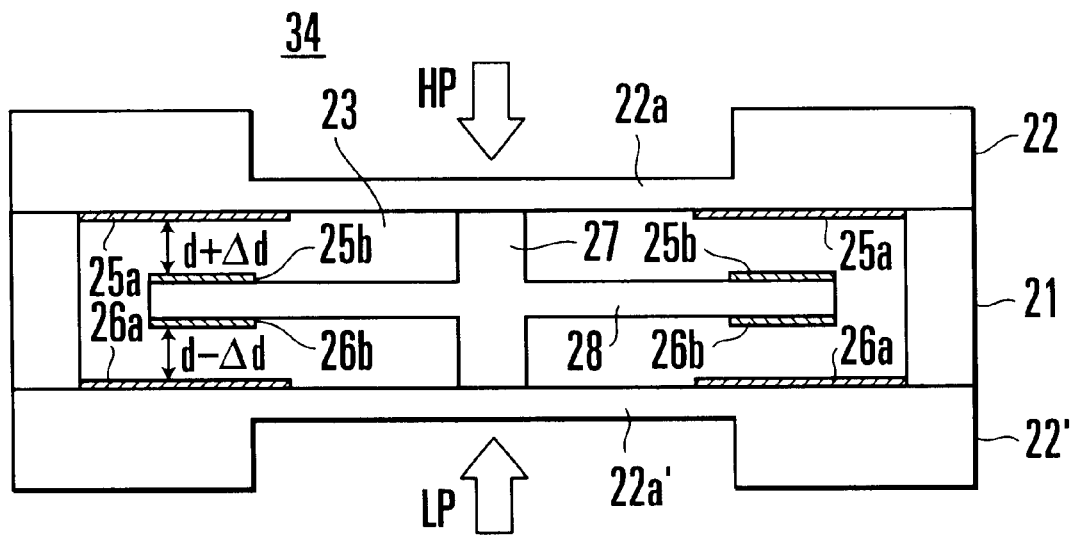
FIG. 2 is a sectional view showing a capacitance type pressure sensor for detecting the difference between pressures applied from two directions.
Figure 3:
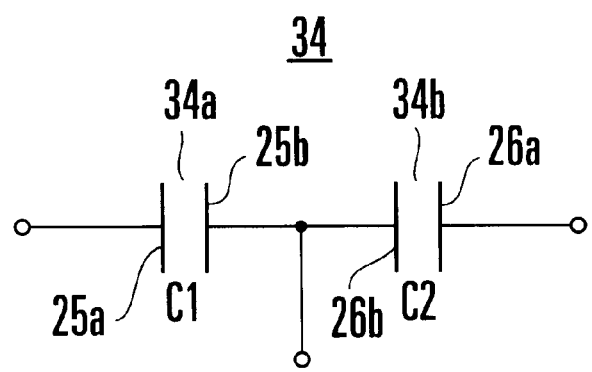
FIG. 3 is a circuit diagram of a sensor section in FIG. 2.

A sensor signal processing circuit according to the present invention can be applied to a capacitance type pressure sensor for detecting the differences between pressures applied from two directions. FIG. 2 shows the structure of a pressure sensor of this type. FIG. 3 shows a sensor section.

Referring to FIG. 2, a sensor section 34 has pressure-sensitive diaphragms 22a and 22a' on two surfaces. In the sensor section 34, recess portions are formed in the central portions of the outer surfaces of the diaphragm substrates 22 and 22', and the bottom portions of the recess portions form the pressure-sensitive diaphragms 22a and 22a'.

The diaphragm substrates 22 and 22' including the pressure-sensitive diaphragms 22a and 22a' are joined to the opening portions of the two ends of a frame member 21 in the form of a cylinder. The space surrounded by the diaphragm substrates 22 and 22' and frame member 21 forms a capacitor chamber 23. The pressure-sensitive diaphragms 22a and 22a' are coupled to a support 27 disposed in the capacitor chamber 23. A central support plate 28 is integrally formed with the support 27 to be parallel to the diaphragm substrates 22 and 22' and kept apart from the diaphragm substrates 22 and 22' and frame member 21. The diaphragm substrates 22 and 22', frame member 21, support 27, and central support plate 28 are formed by insulating members such as sapphire glass members.

Fixed electrodes 25a and 26a made of conductive thin films are formed on the inner surfaces of the peripheral portions of the diaphragm substrates 22 and 22' to oppose each other. Movable electrodes 25b and 26b made of conductive thin films are formed on the peripheral portions of the two surfaces of the central support plate 28 to oppose portions of the fixed electrodes 25a and 26a through a predetermined distance therefrom. A first sensor capacitor 34a is constituted by a pair of electrodes 25a and 25b and the air between them. A second sensor capacitor 34b is constituted by a pair of electrodes 26a and 26b and the air between them.

Pressures HP and LP (HP<LP) are applied to the sensor section 34 having this arrangement from the two surfaces of the pressure-sensitive diaphragm 22a. At this time, the pressure-sensitive diaphragms 22a and 22a' and support 27 integrally move in the direction of the pressure-sensitive diaphragm 22a in accordance with the difference between the pressures HP and LP. As a consequence, since the electrode 25b on the central support plate 28 is displaced in the direction of the pressure-sensitive diaphragm 22a, together with the central support plate 28, the gap between the electrodes 25a and 25b decreases, and a capacitance $C_1$ increases.

At this time, since the electrode 26b is also displaced in the direction of the pressure-sensitive diaphragm 22a, together with the central support plate 28, the gap between the electrodes 26a and 26b increases, and a capacitance $C_2$ of the second sensor capacitor 34b decreases.

Although the first and second sensor capacitors 34a and 34b have temperature characteristics, element-based errors due to temperature changes can be theoretically eliminated from a measurement result by solving equation (23) on the same principle as that described in the first embodiment.

$$K_2=(C_1-C_2)/(C_1+C_2) \tag{23}$$

Letting $\in$ be the dielectric constant of air in the capacitor chamber 23, d be the gap (in non-measurement period) between the electrodes 25a and 25b in the first sensor capacitor 34a and the gap between the electrodes 26a and 26b in the second sensor capacitor 34b, $\Delta d$ be the pressure sensitivity displacement of the pressure-sensitive diaphragms 22a and 22a', and S be the area of each of the opposing surfaces of the electrodes 25a and 25b and the areas of the opposing surfaces of the electrodes 26a and 26b, the capacitances $C_1$ and $C_2$ can be given by $$C_1=\in S/(d+\Delta d) \tag{24}$$

$$C_2=\in S/(d-\Delta d) \tag{25}$$

Substitutions of equations (24) and (25) into equation (23) yield $$K_2=-\Delta d/d \tag{26}$$

Obviously, therefore, the difference between the pressures HP and LP can be obtained from equation (23).

Figure 4:
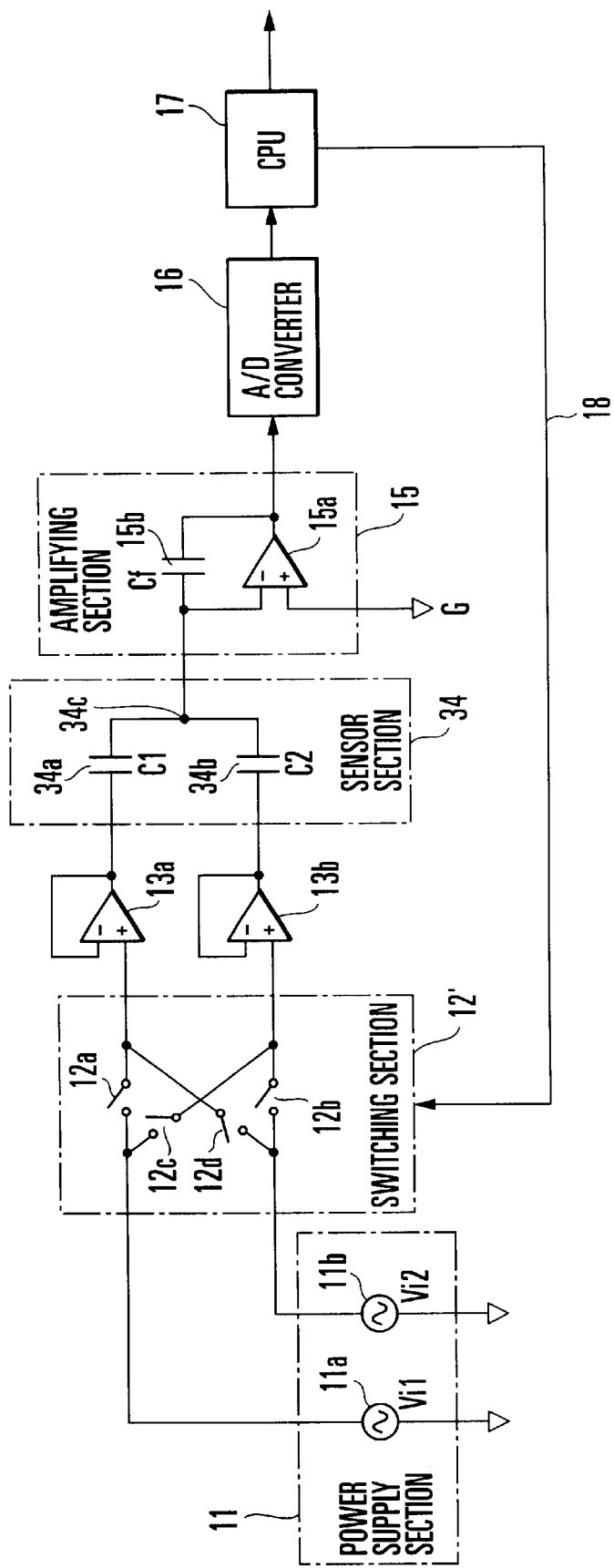
FIG. 4 is a circuit diagram showing a sensor signal processing circuit according to the second embodiment of the present invention which is applied to the capacitance type pressure sensor shown in FIGS. 2 and 3.

FIG. 4 shows a sensor signal processing circuit for extracting a signal from the sensor section 34 in FIG. 2 as a function of a pressure difference.

The sensor signal processing circuit in FIG. 4 differs from the circuit in FIG. 1 in that the sensor section 14 is replaced with a sensor section 34 in FIGS. 2 and 3. Switches 12a to 12d of a switching section 12 are ON/OFF-controlled by control signals 18 (signals s5 to s8) from the CPU 17, as indicated by Table 2. Note that since the noninverting input terminal (+) of a buffer 13b does not float while the signals s5 to s8 are output, a switching section 12' does not have a switch 12e (FIG. 1).

TABLE 2

|  | Switch 12a | Switch 12b | Switch 12c | Switch 12d |
|---|---|---|---|---|
| Signal s5 | on | on | off | off |
| Signal s6 | off | off | on | on |
| Signal s7 | on | off | on | off |
| Signal s8 | off | off | off | on |

In this arrangement, in consideration of errors $e_1$ to $e_3$ based on the offsets of buffers 13a and 13b and operational amplifier 15a, output voltages $V_5$ to $V_8$ from an amplifying section 15 when the signals s5 to s8 are supplied to the switching section 12' are expressed as follows:

$$V_5=-[C_1(V_{i1}+e_1)+C_2(V_{i2}+e_2)]/C_f+e_3 \tag{27}$$

$$V_6=-[C_1(V_{i2}+e_1)+C_2(V_{i1}+e_2)]/C_f+e_3 \tag{28}$$

$$V_7=-[C_1(V_{i1}+e_1)+C_2(V_{i1}+e_2)]/C_f+e_3 \tag{29}$$

$$V_8=-[C_1(V_{i2}+e_1)+C_2(V_{i2}+e_2)]/C_f+e_3 \tag{30}$$

If $(V_5-V_6)/(V_7-V_8)$ is calculated from equations (27) to (30) and equation (14) is substituted in consideration of voltage variations, then $$(V_5-V_6)/(V_7-V_8)=(C_1-C_2)/(C_1+C_2)\ (=K_2) \tag{31}$$

Thus, circuit-based errors due to offsets and voltage variations can be eliminated, and equation (23) can be obtained. As a consequence, a measurement result from which element-based errors due to temperature changes are eliminated can be obtained by equation (23).

A capacitance type pressure sensor of the type that detects the difference between pressures applied from two directions can also obtain an accurate, high-precision measurement result without any circuit- and element-based errors by using the fourth-quadrant ratio metric method as in the first embodiment.

In the arithmetic processing performed by the CPU 17, four signals input for every switching operation of the switching sections 12 and 12' are used. In the present invention, however, both circuit- and element-based errors can be eliminated by calculating the ratio between the differences between a plurality of signals. The number of signals to be arithmetically processed is not limited to four. In addition, if the sensor section is formed by a reactance-based sensor element, the present invention can be used for, for example, an inductance type sensor such as a variable inductance pressure gage.

(Third Embodiment)

An example of application of the sensor signal processing circuit according to the present invention to a resistance type pressure sensor will be described next. In the resistance type pressure sensor, a distortion gage such as a piezoelectric resistive element is placed on a pressure-sensitive diaphragm to measure an externally applied pressure on the basis of a change in the resistance of the distortion gage when the pressure-sensitive diaphragm is distorted by the applied pressure.

Figure 5:
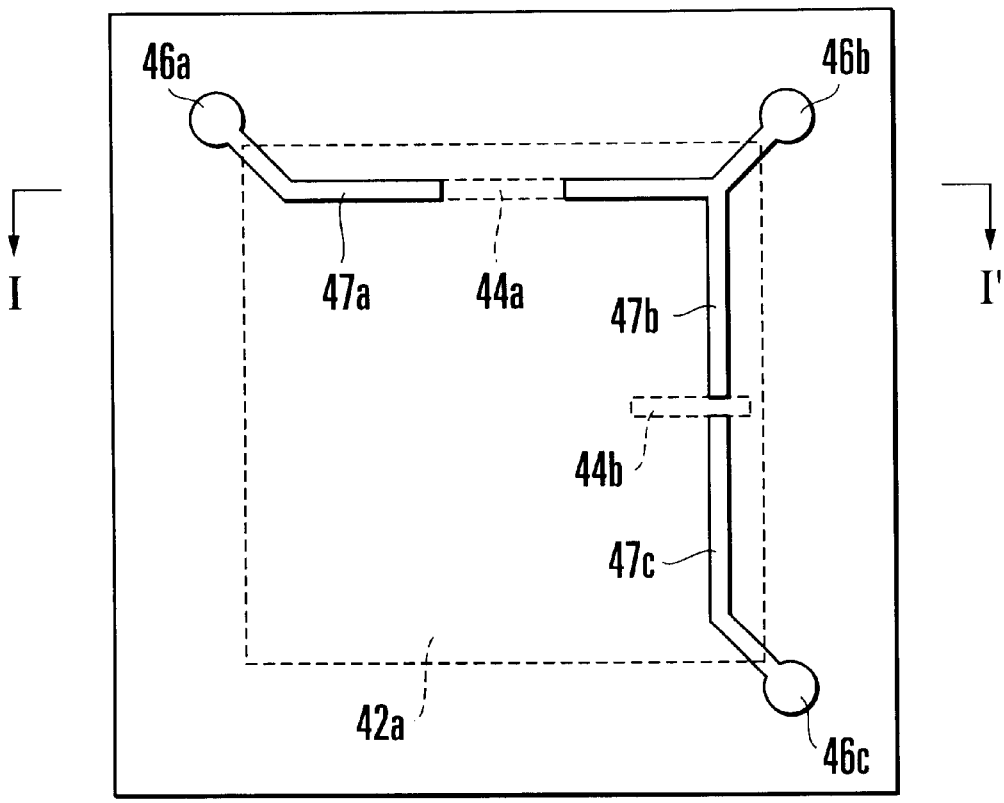
FIG. 5 is a plan view of a resistance type pressure sensor.
Figure 6:
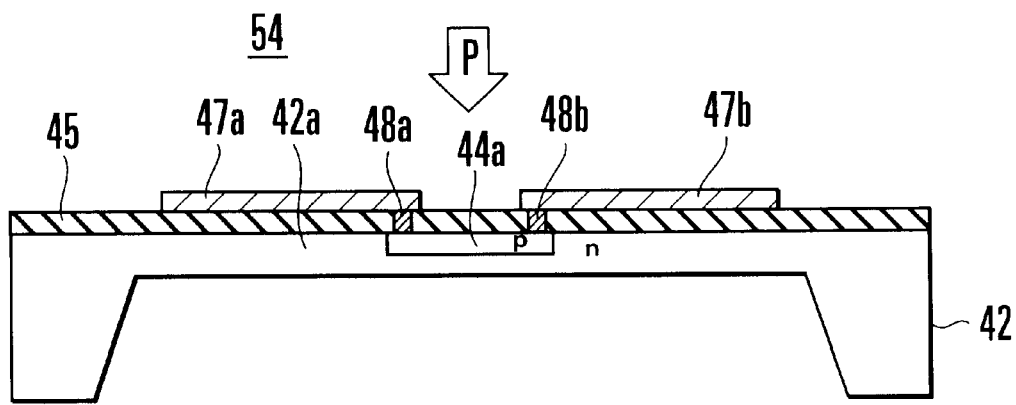
FIG. 6 is a sectional view taken along a line I–I' of the pressure sensor shown in FIG. 5.

In a resistance type pressure sensor in FIG. 5, a diaphragm substrate (corresponding to 42 as shown in FIG. 6) forming a sensor section 54 is made of n-type silicon. A recess portion is formed in the central portion of the lower surface of the diaphragm substrate 42 as shown in FIG. 6, and the bottom portion of the recess portion forms a pressure-sensitive diaphragm 42a. Piezoelectric resistive elements (sensor elements) 44a and 44b made of a p-type diffusion resistive layer are formed at two peripheral portions on the pressure-sensitive diaphragm 42a. The piezoelectric resistive element 44a is formed along the periphery of the pressure-sensitive diaphragm 42a, and the piezoelectric resistive element 44b extends from the periphery of the pressure-sensitive diaphragm 42a to the center.

As shown in FIG. 6, an interlevel dielectric film 45 made of $SiO_2$ is formed on the pressure-sensitive diaphragm 42a, and terminals 46a to 46c and interconnections 47a to 47c made of a metal are formed on the interlevel dielectric film 45. The terminal 46a is a power supply terminal and connected to one end of the piezoelectric resistive element 44a via a plug 48a in the interlevel dielectric film 45. The 46c is also a power supply terminal and connected to one end of the piezoelectric resistive element 44b via the interconnection 47c and a plug (not shown) in the interlevel dielectric film 45. The terminal 46b is an output terminal and connected to the other end of each of the piezoelectric resistive elements 44a and 44b via the interconnection 47b and the plug 47b in the interlevel dielectric film 45.

When a positive pressure P is applied to the upper surface side of the diaphragm substrate 42, the pressure-sensitive diaphragm 42a of the diaphragm substrate 42 deflects toward the lower surface of the diaphragm substrate 42. As the pressure-sensitive diaphragm 42a deflects, the piezoelectric resistive element 44a contracts in its longitudinal direction. As a consequence, a resistance $R_v$ of the piezoelectric resistive element 44a changes from R to R+ΔR (ΔR<0). At this time, since the piezoelectric resistive element 44b extends in the longitudinal direction, a resistance $R_d$ of the piezoelectric resistive element 44b changes from R to R−ΔR (ΔR<0).

In contrast to this, when a negative pressure P is applied to the upper surface side of the diaphragm substrate 42, the pressure-sensitive diaphragm 42a deflects toward the upper surface of the diaphragm substrate 42. As the pressure-sensitive diaphragm 42a deflects, the piezoelectric resistive element 44a extends in its longitudinal direction. As a consequence, the resistance $R_v$ of the piezoelectric resistive element 44a changes from R to R+ΔR (ΔR>0). At this time, the piezoelectric resistive element 44b contracts in the longitudinal direction, and hence the resistance $R_d$ of the piezoelectric resistive element 44b changes from R to R−ΔR (ΔR>0).

As described above, since the resistances $R_v$ and $R_d$ of the piezoelectric resistive elements 44a and 44b change in opposite directions in accordance with the pressure P applied to the diaphragm substrate 42, the potential of the terminal 46b as the node of the piezoelectric resistive elements 44a and 44b changes accordingly. By arithmetically processing the potential of the terminal 46b, therefore, the applied pressure P can be obtained.

Figure 7:
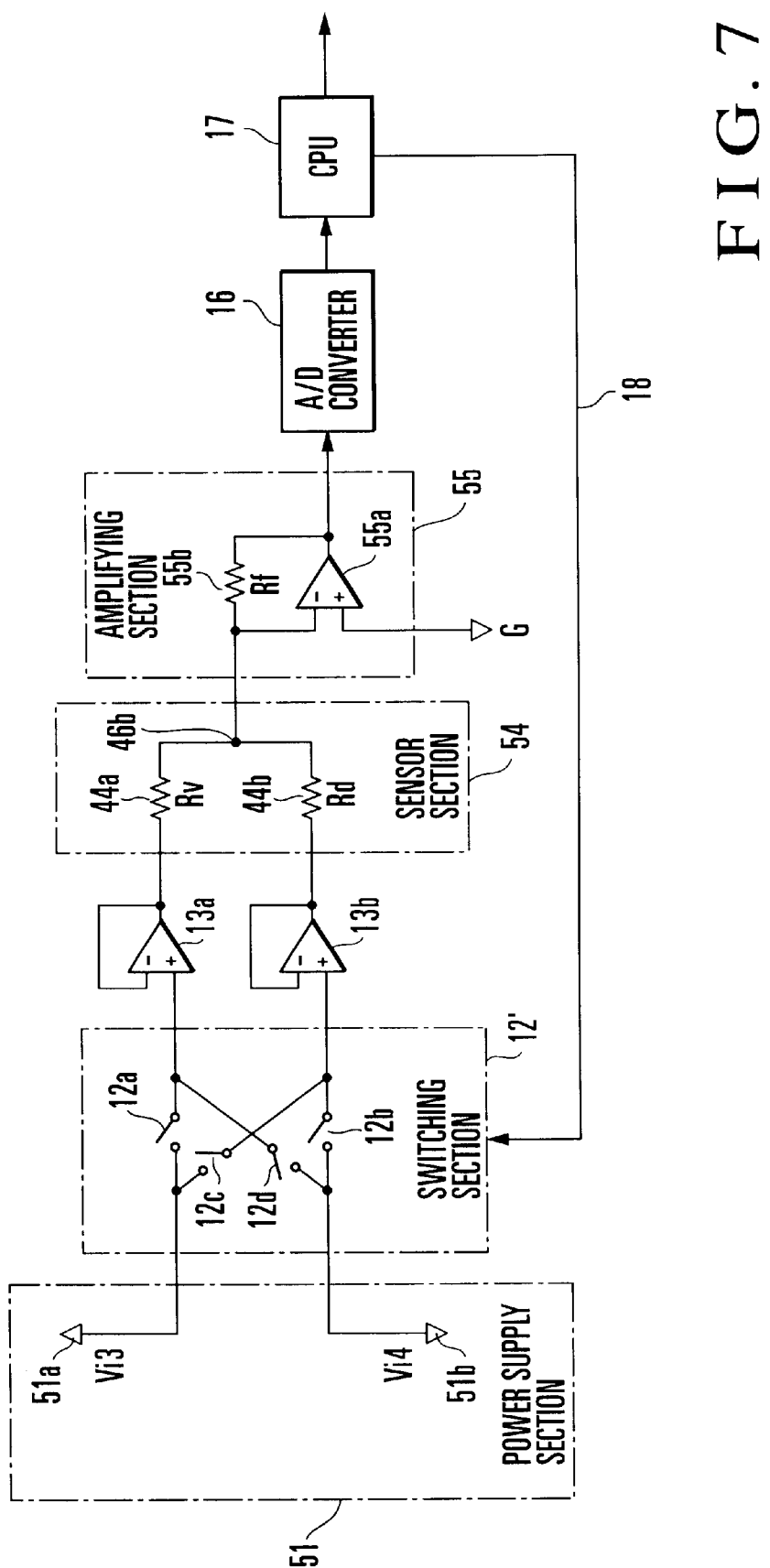
FIG. 7 is a circuit diagram showing a sensor signal processing circuit according to the third embodiment of the present invention which is applied to the pressure sensor shown in FIGS. 5 and 6.

FIG. 7 shows a sensor signal processing circuit for extracting a signal from the sensor section 54 in FIG. 5, i.e., the potential of the terminal 46, as a function of the pressure P.

The sensor signal processing circuit shown in FIG. 7 differs from the circuit shown in FIG. 1 in that the sensor section 14 is replaced with the sensor section 54 shown in FIGS. 5 and 6. A power supply section 51 is constituted by DC power supplies 51a and 51b of two systems having different polarities.

Output voltage $V_{i3}$ and $V_{i4}$ from the power supplies 51a and 51b preferably have the relationship expressed by $V_{i4}$ $$V_{i3} = -V_{i4} \tag{32}$$

If, however, a voltage variation occurs, these output voltages may have the relationship expressed by $$V_{i3} = -\alpha V_{i4} \tag{33}$$

An amplifying section 55 is comprised of an operational amplifier 55a and resistor 55b having a resistance $R_f$. Switches 12a to 12d of a switching section 12' are ON/OFF-controlled by control signals 18 (signals s9 to sC) from the CPU 17. The signals s9 to sC are identical to the signals s5 to s8 (Table 2).

In this arrangement, in consideration of errors $e_1$ to $e_3$ based on the offsets of the buffers 13a and 13b and operational amplifier 55a, output voltages $V_9$ to $V_C$ from the amplifying section 15 when the signals s9 to sC are supplied to the switching section 12' can be given by $$V_9 = -R_f[R_v(V_{i2}+e_2)+R_d(V_{i1}+e_1)]/R_vR_d+e_3 \tag{34}$$

$$V_A = -R_f[R_v(V_{i1}+e_2)+R_d(V_{i2}+e_1)]/R_vR_d+e_3 \tag{35}$$

$$V_B = -R_f[R_v(V_{i1}+e_2)+R_d(V_{i1}+e_1)]/R_vR_d+e_3 \tag{36}$$

$$V_C = -R_f[R_v(V_{i2}+e_2)+R_d(V_{i2}+e_1)]/R_vR_d+e_3 \tag{37}$$

If $(V_9-V_A)/(V_B-V_C)$ is calculated from equations (34) to (37) and equation (33) is substituted in consideration of voltage variations, then $$(V_9-V_A)/(V_B-V_C)=(R_d-R_v)/(R_d+R_v) \tag{38}$$

Thus, circuit-based errors due to offsets and voltage variations are eliminated.

Substitution of $$R_v=R+\Delta R, \ R_d=R-\Delta R \tag{39}$$

into equation (38) yields $$(V_9-V_A)/(V_B-V_C)=-\Delta R/R \tag{40}$$

As described above, the applied pressure P can be obtained by obtaining the change amount ratio between the resistances of the piezoelectric resistive elements 44a and 44b from $(V_9-V_A)/(V_B-V_C)$. Although the piezoelectric resistive elements 44a and 44b have temperature characteristics, element-based errors due to temperature changes can be theoretically eliminated from a measurement result by calculating $(R_d-R_v)/(R_d+R_v)$ on the same principle as that described in the first embodiment.

If, therefore, $(V_9-V_A)/(V_B-V_C)$ is calculated with respect to $V_9$ to $V_C$ after A/D conversion, an accurate, high-precision measurement result including neither circuit-based errors nor element-based errors can be obtained.

(Fourth Embodiment)

In the sensor signal processing circuit shown in FIG. 7, when power supplies 51a and 51b having different polarities are respectively connected to piezoelectric resistive elements 44a and 44b, the output level of a sensor section 54 is considerably lower than that when the single power supply 51a (51b) is connected to the two piezoelectric resistive elements 44a and 44b. More specifically, voltages $V_9$ and $V_A$ are lower in level than voltages $V_B$ and $V_C$ by about two orders of magnitudes. If these voltages $V_9$ to $V_C$ are A/D-converted by an actual circuit, a small value may not accurately A/D-converted owing to resolution.

Figure 8:
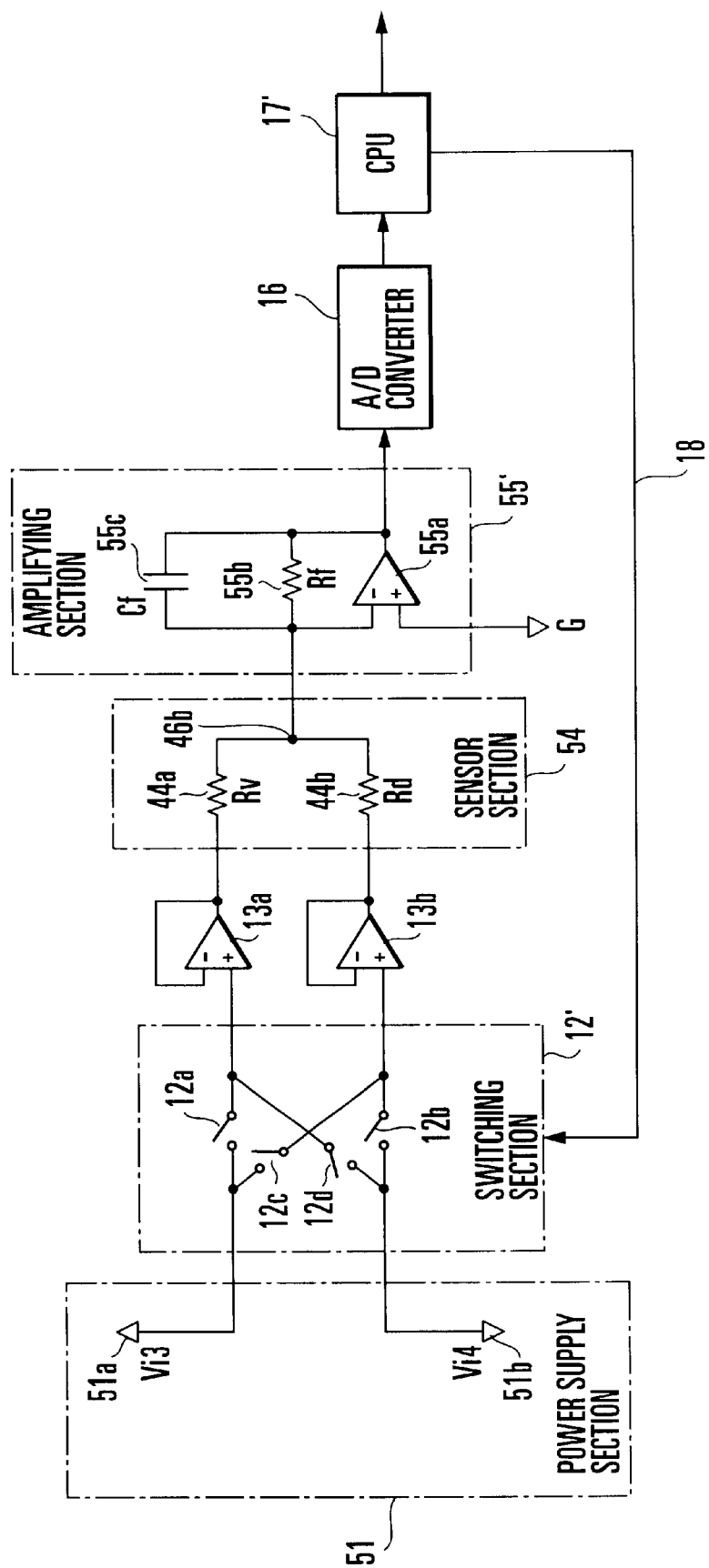
FIG. 8 is a circuit diagram showing a sensor signal processing circuit according to the fourth embodiment of the present invention which is obtained by partly improving the sensor signal processing circuit shown in FIG. 7.
Figure 9A:
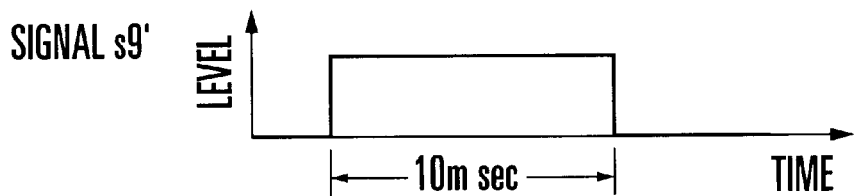
FIGS. 9A to 9D are timing charts of control signals supplied to a switching section in the sensor signal processing circuit in FIG. 8.
Figure 9B:
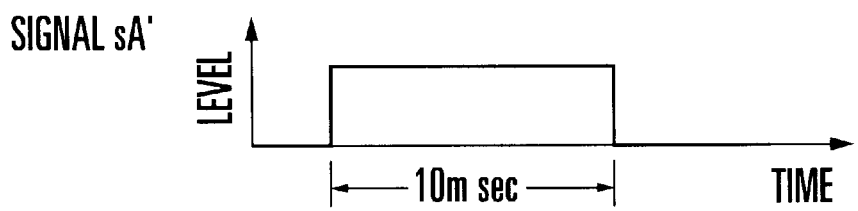
Figure 9C:
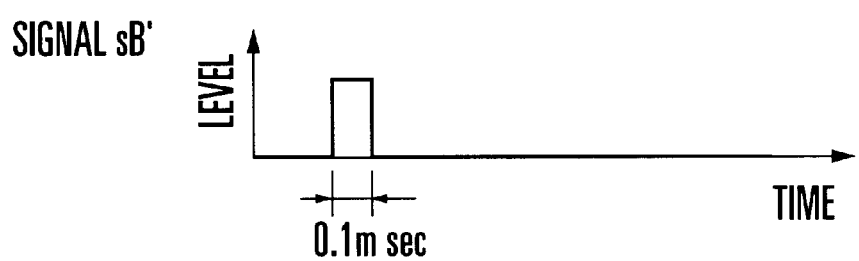
Figure 9D:
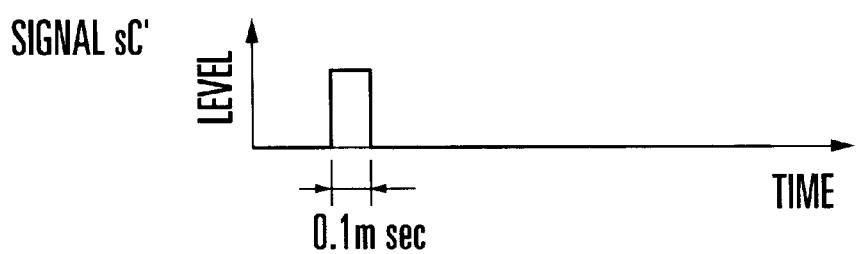

FIG. 8 shows a sensor signal processing circuit that solve the above problem. Referring to FIG. 8, signals s9' to sC' sequentially output as control signals 18 from a CPU 17' are used to control switching operation of a switching section 12' like the signals s9 to sC in the third embodiment. Note that the output time for the signals sB' and sC' is set to 1/100 of the output time of the signals s9' and sA'. For example, if the output time of the signals s9' and sA' is 10 msec, as shown in FIGS. 9A and 9B, the output time of the signals sB' and sC' is set to 0.1 msec, as shown in FIGS. 9C and 9D.

If, therefore, the duty ratio of the switching section 12' is 100% when the signals s9' and sA' are supplied thereto, the duty ratio of the switching section 12' is 1% when the signals sB' and sC' are supplied thereto. This shortens the period during which the single power supply 51a (or 51b) is connected to the two piezoelectric resistive elements 44a and 44b of the sensor section 54. This period becomes 1/100 of the period during which the power supplies 51a and 51b having different polarities are respectively connected to the piezoelectric resistive elements 44a and 44b.

An amplifying section 55' has a capacitor 55c in addition to an operational amplifier 55a and resistor 55b. The capacitor 55c is an integration capacitor for eliminating AC components from an output from the sensor section 54 when the switching section 12' operates at a duty ratio of 1%. The capacitance of the capacitor 55c is set to obtain a sufficiently large time constant.

When the signals sB' and sC' are supplied to the switching section 12', the sensor section 54 outputs a pulse-like signal having a high level. However, the level of output voltages $V_B'$ and $V_C'$ from the amplifying section 55' can be decreased to a level similar to that of output voltages $V_9'$ and $V_A'$ by passing this signal through the amplifying section 55' including the capacitor 55c. In this case, the voltages $V_9'$ to $V_C'$ are output voltages from the amplifying section 15 when the signals s9' to sC' are supplied to the switching section 12'.

This makes it possible to increase the resolution of A/D conversion because the A/D converter 16 can always A/D-convert signals ($V_9'$ to $V_C'$) having similar levels regardless of the connected state between the DC power supplies 51a and 51b and the piezoelectric resistive elements 44a and 44b.

When the signals sB' and sC' are output, the CPU 17' performs arithmetic processing after restoring the level indicated by an A/D-converted signal to the original level. When, for example, the level of a signal A/D-converted by an A/D converter 16 upon sampling is 1/100 of the original level of the signal, the CPU 17' performs arithmetic processing upon increasing the level indicated by the A/D-converted signal by 100 times. Since the CPU 17' performs arithmetic processing upon performing level adjustment after A/D conversion in this manner, a correct processing result can be obtained.

In the above embodiment, a circuit having an integration element may be added between the amplifying section 55' and the A/D converter 16 in place of the integration capacitor 55c. In addition, the duty ratio of the switching section 12' is not limited to 1% as long as it is 1/n (n>1).

(Fifth Embodiment)

In the sensor signal processing circuit shown in FIG. 4, since the input impedance of an operational amplifier 15a of an amplifying section 15 is not actually infinite, a DC bias applied to the operational amplifier 15a leaks from the inverting input terminal (−) to a node 34c of capacitors 34a and 34b.

However, since the node 34c is insulated from external direct currents in a DC manner by the capacitors 34a and 34b of a sensor section 34 and a capacitor 15b of the amplifying section 15, the voltage of the node 34c gradually rises due to the leakage bias. For this reason, an output signal from the sensor section 34 is not properly input to the inverting input terminal (−) of the operational amplifier 15a, an accurate measurement result cannot be obtained. A leakage bias must be made to escape to the outside by connecting a DC bias compensation resistor to the amplifying section 15 in parallel with the capacitor 15b.

Figure 10:
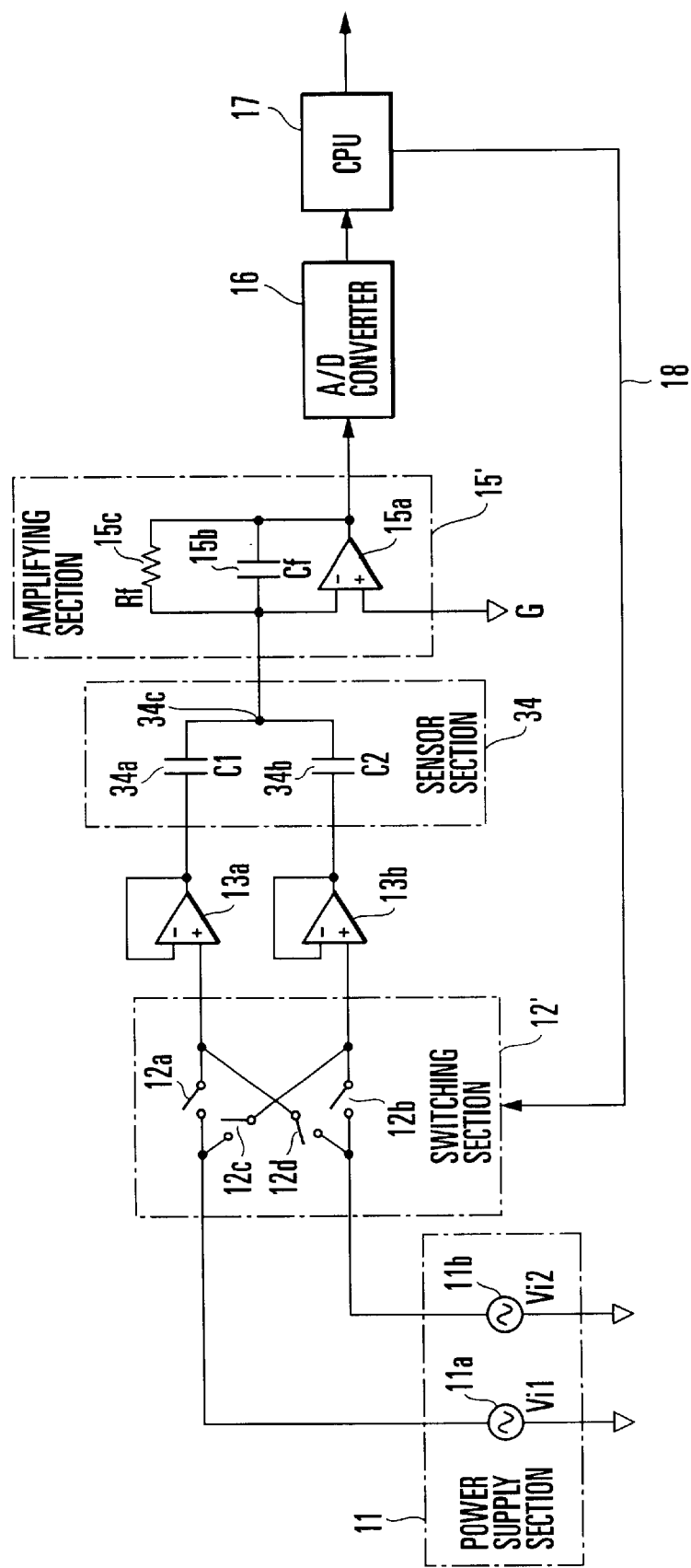
FIG. 10 is a circuit diagram showing a sensor signal processing circuit according to the fifth embodiment of the present invention which has a DC bias compensation resistor in an amplifying section in FIG. 4.

FIG. 10 shows a circuit having such a DC bias compensation resistor in the amplifying section of the sensor signal processing circuit shown in FIG. 4. Referring to FIG. 10, a DC bias compensation resistor 15c having a resistance $R_f$ is connected between the input and output sides of an amplifying section 15' in parallel with the capacitor 15b. The same reference numerals as in FIG. 4 denote the same parts in FIG. 10, and a description thereof will be omitted.

In the sensor signal processing circuit of this embodiment as well, circuit-based errors can be eliminated from a measurement result by using the fourth-quadrant ratio metric method as in the sensor signal processing circuit shown in FIG. 4.

As indicated by Table 2, output voltages $V_{51}$ to $V_{81}$ from the amplifying section 15' when signals s5 to s8 for controlling the operations of the switches 12a to 12d are supplied to the switching section 12' are given by $$V_{51}=\gamma(C_1V_{i1}+C_2V_{i2})+\delta_1 \quad (41)$$

$$V_{61}=\gamma(C_1V_{i2}+C_2V_{i1})+\delta_1 \quad (42)$$

$$V_{71}=\gamma(C_1V_{i1}+C_2V_{i1})+\delta_1 \quad (43)$$

$$V_{81}=\gamma(C_1V_{i2}+C_2V_{i2})+\delta_1 \quad (44)$$

In this case, $$\gamma=-j\omega R_f/(1+j\omega C_f R_f) \quad (45)$$

where $\omega$ is the angular frequency of output voltages $V_{i1}$ and $V_{i2}$ from AC power supplies 11a and 1b, and $\delta_1$ is an offset error of the circuit.

If $(V_{51}-V_{61})/(V_{71}-V_{81})$ is calculated from equations (41) to (44) and equation (14) is substituted in consideration of voltage variations, then $$(V_{51}-V_{61})/(V_{71}-V_{81})=(C_1-C_2)/(C_1+C_2)(=K_2) \quad (46)$$

When the DC bias compensation resistor 15c having the resistance $R_f$ is inserted in this manner, circuit-based errors due to offsets and voltage variations can be eliminated without any influences of the DC bias compensation resistor 15c, and equation (23) can be obtained. As a consequence, a measurement result from which element-based errors due to temperature changes are eliminated by equation (23) can be obtained.

(Sixth Embodiment)

If the capacitance type pressure sensor shown in FIG. 2 is a gage pressure meter, the capacitor chamber 23 of the sensor section 34 communicates with the outside of the housing via an air vent (not shown). For this reason, dust and moisture enter the capacitor chamber 23 from the outside of the housing and act as parasitic resistances connected in parallel with the capacitors 34a and 34b, causing errors.

Figure 11:
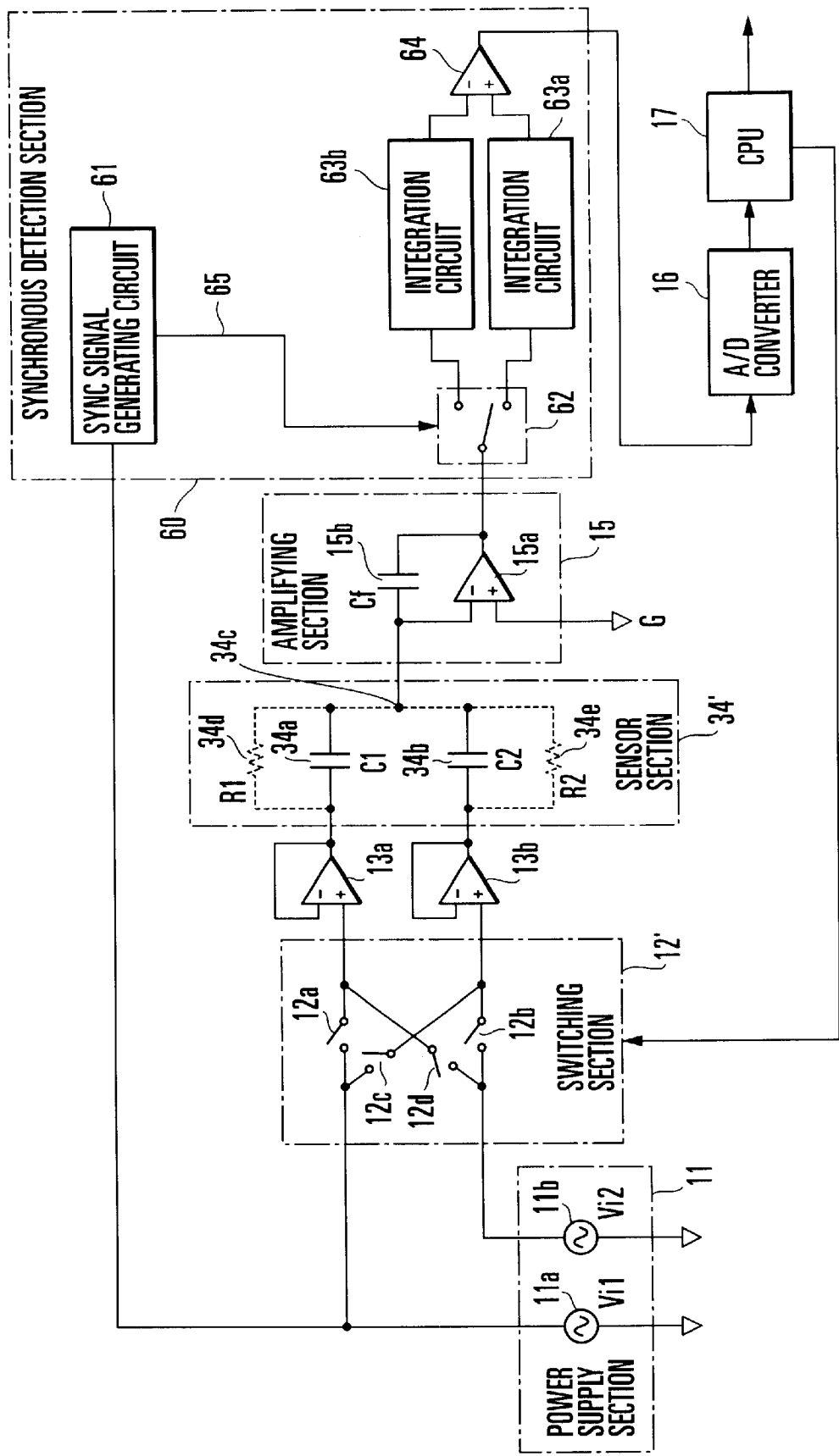
FIG. 11 is a circuit diagram showing a sensor signal processing circuit according to the sixth embodiment of the present invention which eliminates the influences of parasitic resistances produced in a sensor section by synchronous detection.

FIG. 11 shows a sensor signal processing circuit for eliminating the influences of such parasitic resistances by synchronous detection. The sensor signal processing circuit shown in FIG. 11 is obtained by adding a synchronous detection section 60 to the circuit shown in FIG. 4.

Referring to FIG. 11, parasitic resistances 34d and 34e respectively having resistances $R_1$ and $R_2$ due to dust and the like are produced at capacitors 34a and 34b of a sensor section 34'. Assume that output voltages $V_{i1}$ and $V_{i2}$ from AC power supplies 11a and 11b of a power supply section 11 are given by $$V_{i1}=A\sin(\omega t), V_{i2}=B\sin(\omega t) \qquad (47)$$

The synchronous detection section 60 is comprised of a sync signal generating circuit 61, switch 62, integration circuits 63a and 63b, and differential amplifier 64. The sync signal generating circuit 61 is connected to the output side of the AC power supply 11a of the power supply section 11 to monitor the output voltage $V_{i1}$ from the AC power supply 11a and output a sync signal 65 every time the voltage $V_{i1}$ becomes a predetermined voltage. More specifically, every time the voltage $V_{i1}$ becomes 0 or the maximum or minimum value, the sync signal 65 is output.

The switch 62 has one movable contact and two fixed contacts. Of these contacts, the movable contact is connected to the output side of an amplifying section 15, and the fixed contacts are connected to the input sides of the integration circuits 63a and 63b. The switch 62 switches connection between the movable and fixed contacts in accordance with the sync signal 65 output from the sync signal generating circuit 61. The integration circuits 63a and 63b obtain the integrals of input signals and output them.

The noninverting input terminal (+), inverting input terminal (−), and output terminal of the differential amplifier 64 are respectively connected to the integration circuit 63a, the integration circuit 63b, and an A/D converter 16.

Figure 12:
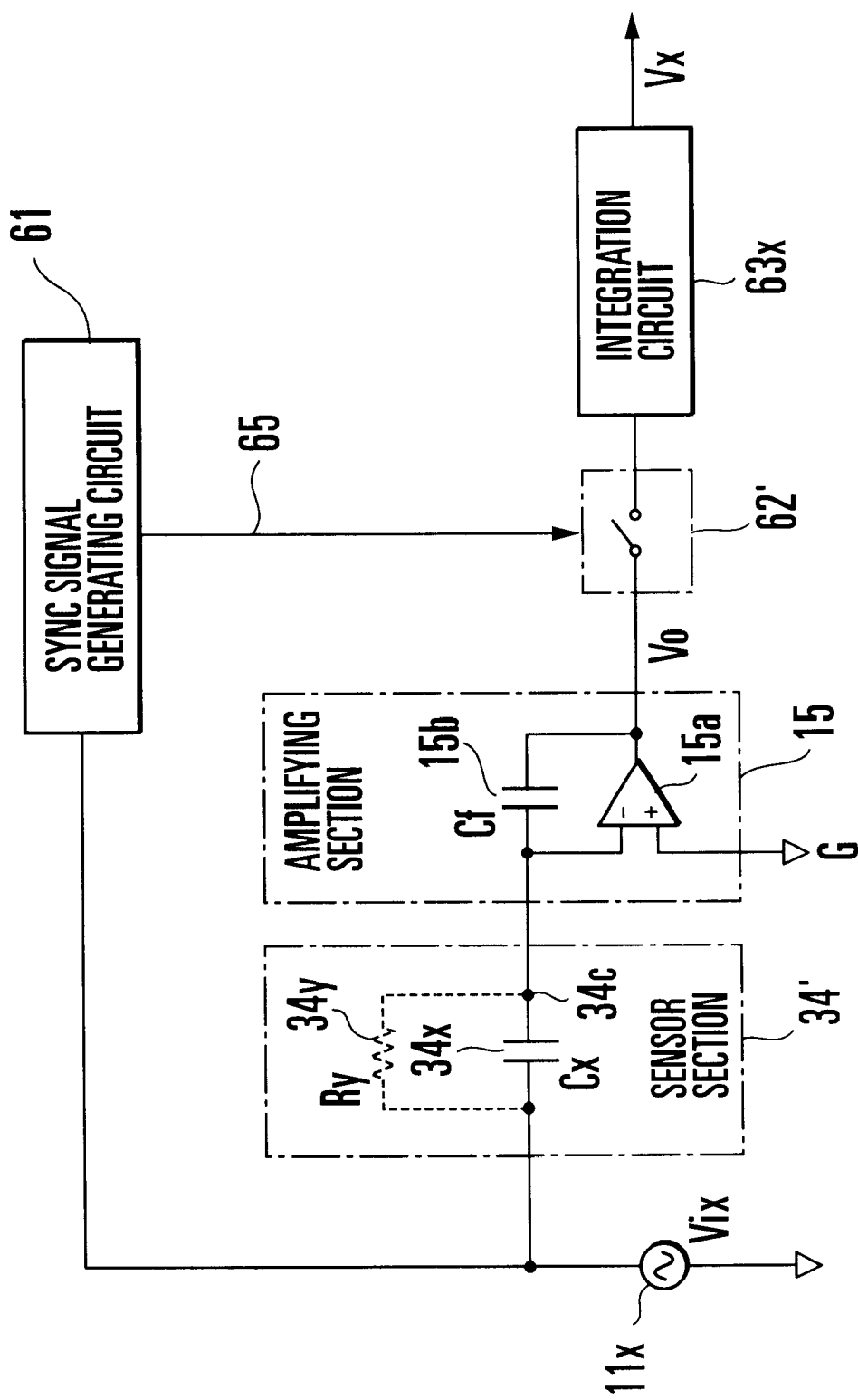
FIG. 12 is a circuit diagram showing the basic arrangement of the sensor signal processing circuit shown in FIG. 11.

The parasitic resistances 34d and 34e can be eliminated by synchronous detection. This will be described next with reference to FIG. 12. FIG. 12 shows the basic arrangement of the sensor signal processing circuit in FIG. 11.

Referring to FIG. 12, an output voltage $V_{ix}$ from an AC power supply 11x corresponds to the output voltages $V_{i1}$ and $V_{i2}$ from the AC power supplies 11a and 11b in FIG. 11. A capacitance $C_x$ of the capacitor 34x corresponds to the capacitances $C_1$ and $C_2$ of the capacitors 34a and 34b in FIG. 11. A resistance $R_y$ of a parallel resistor 34y corresponds to the resistances $R_1$ and $R_2$ of the parallel resistors 34d and 34e in FIG. 11. An integration circuit 63x corresponds to the integration circuits 63a and 63b in FIG. 11. Let $V_o$ be an output voltage from the amplifying section 15, and $V_x$ be an output voltage from the integration circuit 63x.

In this arrangement, if the output voltage $V_{ix}$ from the AC power supply 11x is $$V_{ix}=A\sin(\omega t) \qquad (48)$$

then, the output voltage $V_o$ from the amplifying section 15 is given by $$V_o = \frac{A}{C_f R_y \omega}\sqrt{1+(C_x R_y \omega)^2} \cdot \sin\left(\omega t + \arctan\left(-\frac{1}{C_x R_y \omega}\right)\right) \qquad (49)$$

Consider a case wherein the voltage $V_o$ given by equation (49) is subjected to synchronous detection with a time difference $\Delta t$ with respect to the voltage $V_{ix}$. In this case, synchronous detection is the operation of obtaining the integral of the output voltage $V_o$ from the amplifying section 15 in synchronism with the output voltage $V_{ix}$ from the AC power supply 11x in an interval ½ the period of the voltage $V_{ix}$. In this case, since synchronous detection of the voltage $V_o$ is performed with the time difference $\Delta t$ with respect to the voltage $V_{ix}$, a switch 62' keeps connecting the amplifying section 15 to the integration circuit 63x for a period of $\Delta t$ to ½f+$\Delta t$, where f is the frequency of the voltage $V_{ix}$ and has the following relationship.

$$\omega = 2\pi f \qquad (50)$$

In this case, the output voltage $V_x$ from the integration circuit 63x is given by $$V_x = 2f \int_{\Delta t}^{1/2f+\Delta t} V_o \, dt \qquad (51)$$

If equation (51) is solved, then equation (52a) or (52b) is obtained.

$$V_x = \frac{2A\cos(2\pi f \Delta t)}{\pi C_f}\left(C_x + \frac{1}{2\pi f R_y}\tan(2\pi f \Delta t)\right) \qquad (52a)$$

$$V_x = \frac{A\sin(2\pi f \Delta t)}{\pi f^2 C_f}\left(2\pi f C_x \tan\left(\frac{\pi}{2} - 2\pi f \Delta t\right) + \frac{1}{R_y}\right) \qquad (52b)$$

If synchronous detection is to be performed in phase with the output voltage $V_{ix}$ from the AC power supply 11x, a substitution of $\Delta t=0$ into equation (52a) yields $$V_x = 2AC_x/(\pi C_f) \qquad (53)$$

As is obvious from equation (53), since the resistance $R_y$ of the parallel resistor 34y is eliminated, the capacitance $C_x$ of the capacitor 34x can be measured without being influenced by the parallel resistor 34y.

To perform synchronous detection in phase with the voltage $V_{ix}$, the sync signal generating circuit 61 is set to output the sync signal 65 every time the voltage $V_{i1}$ becomes 0, and the voltage $V_o$ is integrated in the interval between the instant at which the voltage $V_{i1}$ becomes 0 and the instant at which it becomes 0 next.

If synchronous detection is performed with a phase delay of 90° from the voltage $V_{ix}$, a substitution of $\Delta t=1/(4f)$ into equation (52b) yields $$V_x = A/(\pi f^2 C_f R_y) \qquad (54)$$

As is obvious from equation (54), since the capacitance $C_x$ of the capacitor 34x is eliminated, the resistance $R_y$ of the parallel resistor 34y can be measured without being influenced by the capacitor 34x.

When synchronous detection is to be performed with a phase delay of 90° from the voltage $V_{ix}$, the sync signal generating circuit 61 is set to output the sync signal 65 every time the voltage $V_{i1}$ becomes the maximum or minimum value, the voltage $V_o$ is integrated in the interval between the instant at which the voltage $V_{i1}$ becomes the maximum value (or minimum value) and the instant at which it becomes minimum value (maximum value).

Referring back to FIG. 11, in the sensor signal processing circuit, the output voltage $V_o$ from the amplifying section 15 is alternately output to the two integration circuits 63a and 63b at intervals of ½ the period of the output voltage $V_{i1}$ from the AC power supply 11a. The voltages $V_x$ integrated by the integration circuits 63a and 63b therefore have opposite polarities. However, since the differential amplifier 64 inverts the polarity of the output voltage $V_x$ from the integration circuit 63b, the differential amplifier 64 outputs voltages having one of the polarities. That is, the output voltage $V_o$ from the amplifying section 15 is AC/DC-converted by the switch 62 and differential amplifier 64.

In the above embodiment, the two integration circuits 63a and 63b are connected to the input stage of the differential amplifier 64. However, one integration circuit may be connected to the output stage of the differential amplifier 64. In addition, all the functions of the synchronous detection section 60 or the functions except for the function of the sync signal generating circuit 61 may be implemented by a CPU 17.

As described with reference to FIG. 12, the influences of the parasitic resistances 34d and 34e produced at the capacitors 34a and 34b of the sensor section 34' can be eliminated by synchronous detection. The sensor signal processing circuit shown in FIG. 11 can therefore eliminate circuit-based errors such as offsets by using the fourth-quadrant ratio metric method, as will be described below.

A case wherein synchronous detection is performed in phase with the output voltage $V_{i1}$ from the AC power supply 11a will be described first.

As indicated by Table 2, output voltages $V_{52}$ to $V_{82}$ from an amplifying section 15' when control signals 18 (signals s5 to s8) from the CPU 17 are supplied to a switching section 12' are given by $$V_{52}=(2/\pi C_f)\times(AC_1+BC_2)+\delta_2 \quad (55)$$

$$V_{62}=(2/\pi C_f)\times(BC_1+AC_2)+\delta_2 \quad (56)$$

$$V_{72}=(2/\pi C_f)\times(AC_1+AC_2)+\delta_2 \quad (57)$$

$$V_{82}=(2/\pi C_f)\times(BC_1+BC_2)+\delta_2 \quad (58)$$

where $\delta_2$ is an offset error in the circuit. In equations (55) to (58), consideration is given to variations in the output voltages $V_{i1}$ and $V_{i2}$ from the AC power supplies 11a and 11b.

If $(V_{52}-V_{62})/(V_{72}-V_{82})$ is calculated from equations (55) to (58), then $$(V_{52}-V_{62})/(V_{72}-V_{82})=(C_1-C_2)/(C_1+C_2)\ (=K_2) \quad (59)$$

As described above, even if the parasitic resistances 34d and 34e are produced in the sensor section 34', circuit-based errors due to offsets, voltage variations, and the like can be eliminated without any influences of the parasitic resistances, and equation (23) can be obtained. As a consequence, element-based errors due to temperature changes can be eliminated from a measurement result by equation (23), and hence an accurate, high-precision pressure can be obtained.

A case wherein synchronous detection is performed with a phase delay of 90° from the output voltage $V_{i1}$ from the AC power supply 11a will be described next.

Output voltages $V_{53}$ to $V_{83}$ from the amplifying section 15' when the signals s5 to s8 are supplied to the switching section 12' are given by $$V_{53}=(1/\pi f^2 C_f)\times(A/R_1+B/R_2)+\delta_2 \quad (60)$$

$$V_{63}=(1/\pi f^2 C_f)\times(B/R_1+A/R_2)+\delta_2 \quad (61)$$

$$V_{73}=(1/\pi f^2 C_f)\times(A/R_1+A/R_2)+\delta_2 \quad (62)$$

$$V_{83}=(1/\pi f^2 C_f)\times(B/R_1+B/R_2)+\delta_2 \quad (63)$$

In equations (60) to (63) as well, consideration is given to the output voltages $V_{i1}$ and $V_{i2}$ from the AC power supplies 11a and 11b.

If $(V_{53}-V_{63})/(V_{73}-V_{83})$ is calculated from equations (60) to (63), then $$(V_{53}-V_{63})/(V_{73}-V_{83})=(-R_1+R_2)/(R_1+R_2) \quad (64)$$

In this manner, the value $((-R_1+R_2)/(R_1+R_2))$ consisting of only the resistances $R_1$ and $R_2$ of the parasitic resistances 34d and 34e can be obtained without being influenced by the capacitances $C_1$ and $C_2$ of the capacitors 34a and 34b and circuit-based errors. The magnitudes of the parasitic resistances $R_1$ and $R_2$ can be known from this value.

Although not described in detail, when the sensor signal processing circuit in FIG. 11 uses a resistor (not shown) in place of the capacitor 15b of the amplifying section 15, $(-R_1+R_2)/(R_1+R_2)$ without any influences of the capacitances $C_1$ and $C_2$ of the capacitors 34a and 34b and the like can be obtained by synchronous detection in phase with the output voltage $V_{i1}$ from the AC power supply 11a. In addition, $(C_1-C_2)/(C_1+C_2)$ without any influences of the resistances $R_1$ and $R_2$ of the parasitic resistances 34d and 34e can be obtained by performing synchronous detection with a phase delay of 90°.

(Seventh Embodiment)

According to the sensor signal processing circuit shown in FIG. 11, the influences of parasitic resistances 34d and 34e produced at capacitors 34a and 34b can be eliminated by synchronous detection. In an actual circuit, however, as shown in FIG. 10, a DC bias compensation resistor 15c must be connected in parallel with a capacitor 15b of an amplifying section 15.

However, the DC bias compensation resistor 15c changes the phase of an output voltage $V_o$ from the amplifying section 15, and hence the influences of the parallel resistors 34d and 34e cannot be eliminated by the same synchronous detection as that in the sensor signal processing circuit in FIG. 11 alone. A sensor signal processing circuit that can eliminate the influences of the parallel resistors 34d and 34e even with the DC bias compensation resistor 15c connected to the amplifying section 15 will be described below.

Figure 13:
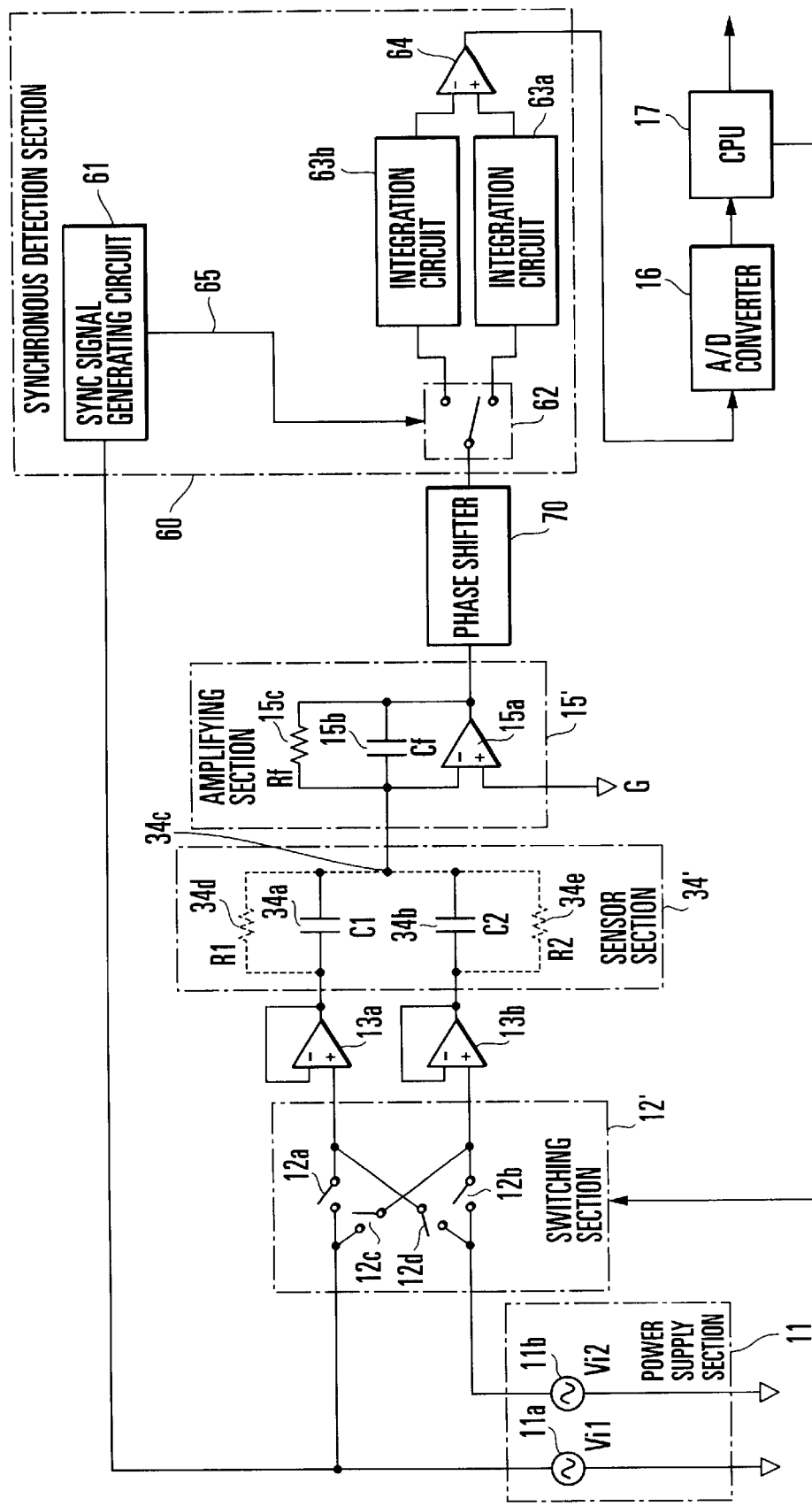
FIG. 13 is a circuit diagram showing a sensor signal processing circuit according to the seventh embodiment of the present invention which eliminates the influences of resistances produced in a sensor section in FIG. 10.

FIG. 13 shows a sensor signal processing circuit that solves the above problem. This sensor signal processing circuit is obtained by adding a phase shifter 70 to the sensor signal processing circuit in FIG. 11. The phase shifter 70 is inserted between the output side of an amplifying section 15' and the input side of a switch 62.

The phase shifter 70 has a phase shift amount that compensate for a phase shift by the DC bias compensation resistor 15c. As the phase shifter 70, for example, a bandpass filter (BPF) or all-pass filter (APF) can be used.

A method of designing the phase shifter 70 will be described next.

Figure 14:
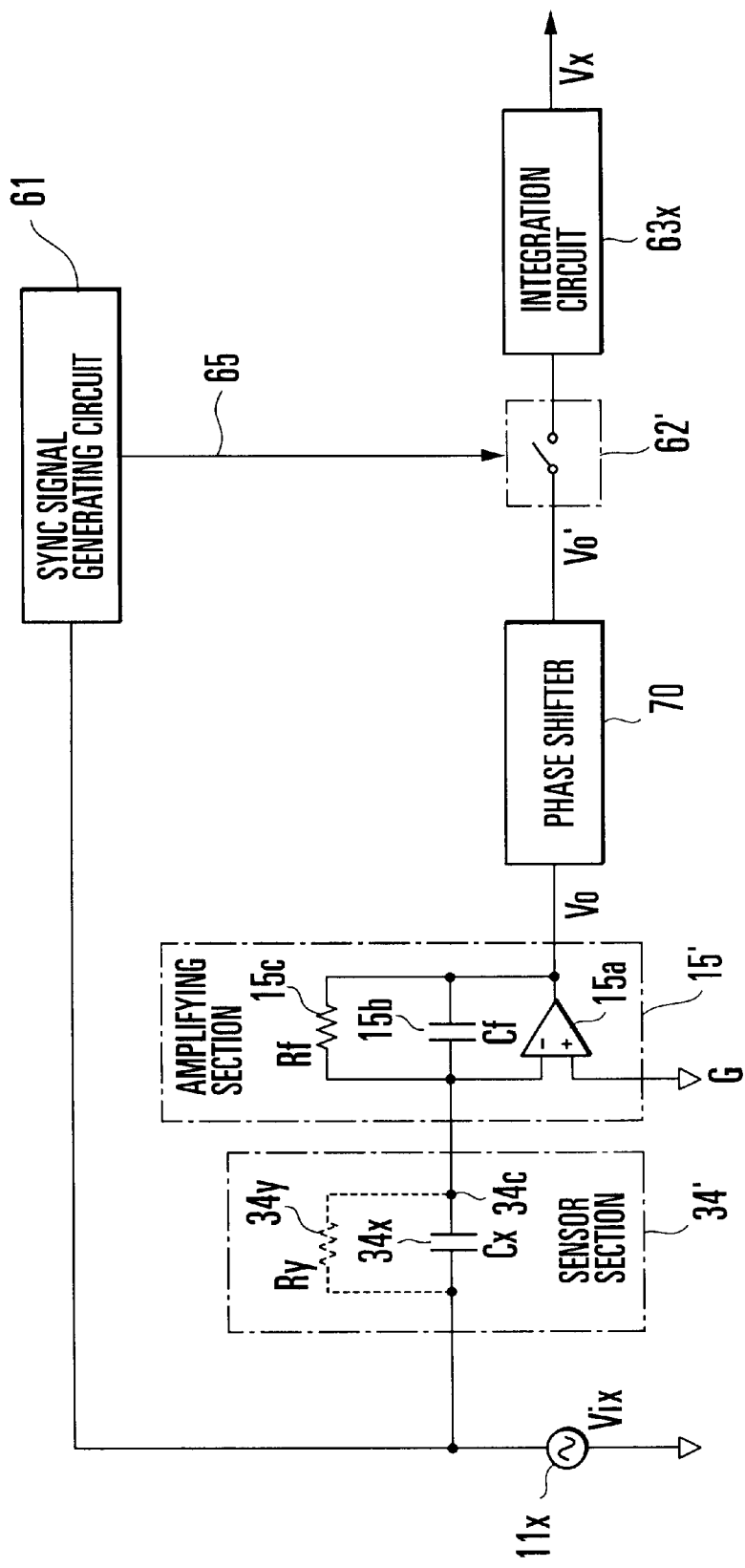
FIG. 14 is a circuit diagram showing the basic arrangement of the sensor signal processing circuit shown in FIG. 13.
Figure 15:
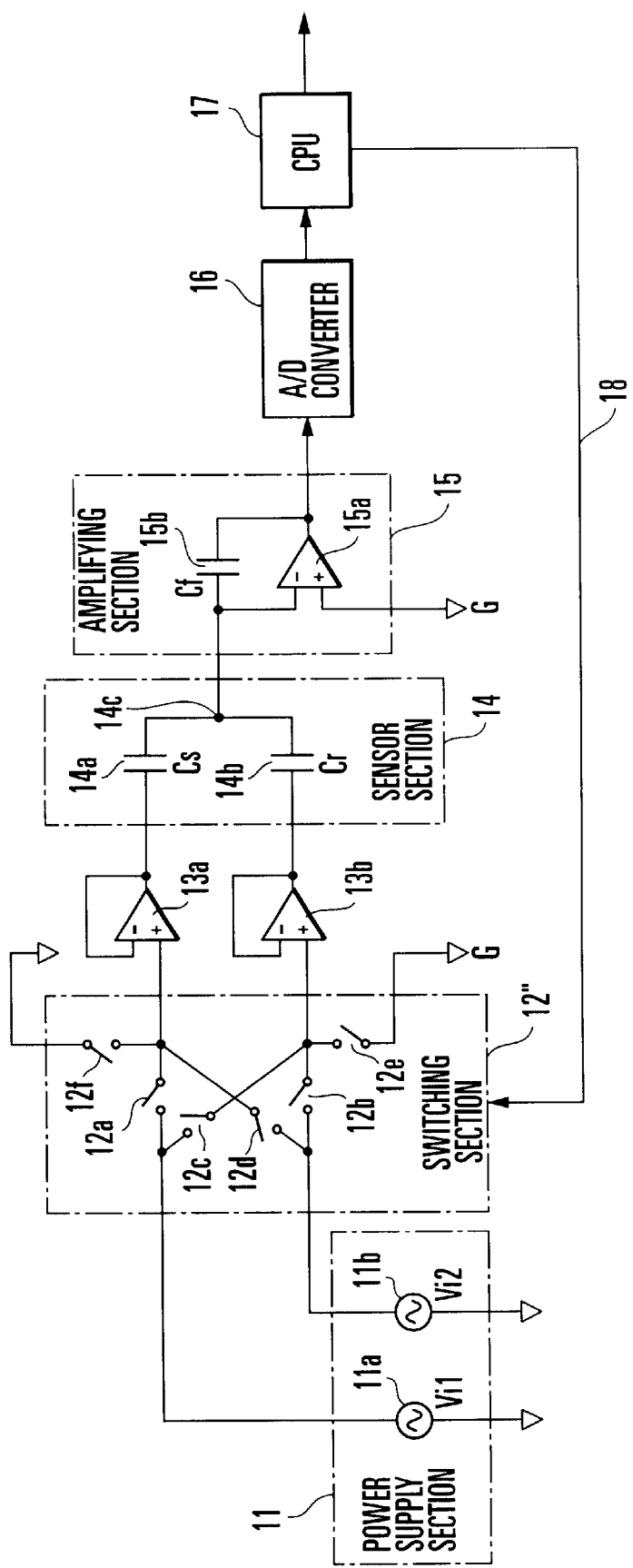
FIG. 15 is a circuit diagram showing a sensor signal processing circuit according to the seventh embodiment of the present invention which is a modification to the circuit shown in FIG. 1.

FIG. 14 shows the basic arrangement of a sensor signal processing circuit in FIG. 15. The same reference numerals as in FIG. 12 denote the same parts in FIG. 14, and a description thereof will be omitted. Referring to FIG. 14, assuming that a sensor section 34' does not have a parasitic resistance 34y, the output voltage $V_o$ from the amplifying section 15' when an output voltage $V_{ix}$ from an AC power supply 11x is expressed by equation (48) is given by $$V_o = \frac{AC_x R_f \omega}{\sqrt{1+(C_f R_f \omega)^2}} \sin\left(\omega t + \arctan\left(\frac{1}{C_f R_f \omega}\right)\right) \quad (65)$$

As indicated by equation (65), when the parasitic resistance 34y is not produced in the sensor section 34', a phase shift of arc $\tan(1/C_f R_f \omega)$ is produced by the DC bias compensation resistor 15c. By setting the phase amount of the phase shifter 70 to arc $\tan(1/C_f R_f \omega)$, therefore, the phase shift caused by the DC bias compensation resistor 15c can be compensated.

A case wherein a BPF is used as the phase shifter 70 will be described next. The BPF is a filter for passing only signals having frequencies within a certain frequency range and attenuating signals having other frequencies.

A transfer function $A_1(S)$ of the BPF is expressed by $$A_1(s) = K_p (W_p/Q_p) s / [s^2 + (W_p/Q_p)s + W_p^2] \quad (66)$$

where $W_p$ is a frequency representing the peak value of an amplitude characteristic, $Q_p$ is an amount representing the steepness of the amplitude characteristic, and $K_p$ is an amount representing the magnitude of the overall amplitude characteristic.

Since the imaginary part of the equation obtained by a substitution of $s=j\omega$ into equation (66) represents a phase shift, a phase shift of arc $\tan\{Q_p(-\omega/W_p + W_p/\omega)\}$ is produced by the BPF.

In order to set the phase shift amount of the BPF to compensate for the phase shift based on the DC bias compensation resistor 15c, a BPF may be designed to satisfy the relation expressed by $$Q_p(-\omega/W_p + W_p/\omega) = -1/C_f R_f \omega \quad (67)$$

If equation (67) is solved, equation (68) can be obtained.

$$W_p = \frac{-1 + \sqrt{1 + (2Q_p C_f R_f \omega)^2}}{2Q_p C_f R_f} \quad (68)$$

Since the phase shift based on the DC bias compensation resistor 15c can be compensated by designing a BPF having the frequency $W_p$ indicated by equation (68), measurement can be performed without being influenced by the parasitic resistance 34y produced in the sensor section 34'.

Whether a capacitance $C_x$ of the capacitor 34x as a sensor element can be measured without being influenced by the parasitic resistance 34y produced in the sensor section 34' will be checked. Assume that the phase shifter 70 has the characteristics represented by equation (68) in FIG. 14. When the output voltage $V_{ix}$ from the AC power supply 11x is represented by equation (48), an output voltage $V_o'$ from the phase shifter 70 is given by $$V_o' = \frac{A K_p C_f R_f^2 \omega \sqrt{1 + (C_x R_y \omega)^2}}{R_y (1 + (C_f R_f \omega)^2)} \sin\left(\omega t - \arctan\left(\frac{1}{C_x R_y \omega}\right)\right) \quad (69)$$

Subsequently, synchronous detection of the voltage $V_o'$ given by equation (69) is performed in phase with the voltage $V_{ix}$. At this time, an output voltage $V_x$ from an integration circuit 63x is given by $$V_x = \zeta A C_x \quad (70)$$

In this case, $$\zeta = 8\pi f^2 K_p C_f R_f^2 / \{1 + (2\pi f C_f R_f)^2\} \quad (71)$$

As is obvious from equations (70) and (71), since a resistance $R_y$ of the parasitic resistance 34y is eliminated, the capacitance $C_x$ of the capacitor 34x can be measured without being influenced by the parasitic resistance 34y.

As described above, even if the DC bias compensation resistor 15c is provided for the amplifying section 15', the influences of the parasitic resistances 34d and 34e produced in the sensor section 34' can be eliminated by inserting the phase shifter 70 and performing synchronous detection. The sensor signal processing circuit shown in FIG. 13 can therefore eliminate circuit-based errors such as offsets by using the fourth-quadrant ratio metric method.

When synchronous detection is to be performed in phase with an output voltage $V_{i1}$ from an AC power supply 11a, output voltages $V_{54}$ to $V_{84}$ from a synchronous detection section 60 when signals s5 to s8 for controlling the operations of the switches 12a to 12d are supplied to a switching section 12' are given by $$V_{54} = \zeta(AC_1 + BC_2) + \delta_3 \quad (72)$$

$$V_{64} = \zeta(BC_1 + AC_2) + \delta_3 \quad (73)$$

$$V_{74} = \zeta(AC_1 + AC_2) + \delta_3 \quad (74)$$

$$V_{84} = \zeta(BC_1 + BC_2) + \delta_3 \quad (75)$$

where $\delta_3$ is the offset error in the circuit. Note that in equations (72) to (75), consideration is given to variations in the output voltages $V_{i1}$ and $V_{i2}$ from the AC power supplies 11a and 11b.

If $(V_{54} - V_{64})/(V_{74} - V_{84})$ is calculated from equations (72) to (75), then $$(V_{54} - V_{64})/(V_{74} - V_{84}) = (C_1 - C_2)/(C_1 + C_2)(= K_2) \quad (76)$$

As described above, even if the parasitic resistances 34d and 34e are produced in the sensor section 34' when the DC bias compensation resistor 15c is provided for the amplifying section 15', errors due to offsets and voltage variations can be eliminated without being influenced by the parasitic resistances, and equation (23) can be obtained. As a consequence, since element-based errors due to temperature changes can be eliminated from a measurement result according to equation (23), an accurate, high-precision pressure value can be obtained.

A case wherein an APF is used as the phase shifter 70 will be described next. The APF is a filter for passing signals in all frequency ranges and changing only their phases.

A transfer function $A_2(s)$ of the APF is expressed by $$A_2(s) = (s - W_p)/(s + W_p) \quad (77)$$

As a consequence, a phase shift of arc $\tan\{2\omega W_p/(\omega^2 - W_p^2)\}$ is produced by the APF.

Therefore, $$2\omega W_p/(\omega^2 - W_p^2) = -1/C_f R_f \omega \quad (78)$$

That is, by designing an APF having the relation expressed by $$W_p = C_f R_f \omega^2 + \omega[1 + (C_f R_f \omega)^2]^{1/2} \quad (79)$$

the phase shift caused by the DC bias compensation resistor 15c can be compensated. This makes it possible to perform measurement without any influences of the parasitic resistance 34y produced in the sensor section 34'.

Whether the capacitance $C_x$ of the capacitor 34x as a sensor element can be measured without being influenced by the parasitic resistance 34y produced in the sensor section 34' will be checked. Assume that the phase shifter 70 has the characteristics represented by equation (79) in FIG. 14. When the output voltage $V_{ix}$ from the AC power supply 11x is represented by equation (48), the output voltage $V_o'$ from the phase shifter 70 is given by $$V_o' = \frac{A R_f}{R_y} \sqrt{\frac{1 + (C_x R_y \omega)^2}{1 + (C_f R_f \omega)^2}} \sin\left(\omega t - \arctan\left(\frac{1}{C_x R_y \omega}\right)\right) \quad (80)$$

Subsequently, synchronous detection of the voltage $V_o'$ expressed by equation (80) is performed in phase with the voltage $V_{ic}$. At this time, the output voltage $V_x$ from the integration circuit 63x is given by $$V_x = \eta A C_x \tag{81}$$

In this case, $$\eta = 4 f R_f / \{1 + (2\pi f C_f R_f)^2\}^{1/2} \tag{82}$$

Obviously, since the resistance $R_y$ of the parasitic resistance 34y is eliminated in equations (81) and (82), the capacitance $C_x$ of the capacitor 34x can be measured without being influenced by the parasitic resistance 34y.

The fourth-quadrant ratio metric method used by the sensor signal processing circuit in FIG. 13 will be described next.

When synchronous detection is to be performed in phase with the output voltage $V_{i1}$ from the AC power supply 11a, the output voltages $V_{55}$ to $V_{85}$ from the synchronous detection section 60 when the signals s5 to s8 are supplied to the switching section 12' are given by $$V_{55} = \eta (AC_1 + BC_2) + \delta_4 \tag{83}$$

$$V_{65} = \eta (BC_1 + AC_2) + \delta_4 \tag{84}$$

$$V_{75} = \eta (AC_1 + AC_2) + \delta_4 \tag{85}$$

$$V_{85} = \eta (BC_1 + BC_2) + \delta_4 \tag{86}$$

where $\delta_4$ is an offset error in the circuit.

From equations (83) to (86), equation (87) can be obtained.

$$(V_{55} - V_{65})/(V_{75} - V_{85}) = (C_1 - C_2)/(C_1 + C_2)(= K_2) \tag{87}$$

Even when the phase shifter 70 is formed by using an APF in this manner, circuit- and element-based errors can be eliminated without being influenced by the parasitic resistance 34y as in the case of the BPF.

Each of the fifth to seventh embodiments has exemplified the capacitance type pressure sensor for detecting the difference between pressures applied from two directions. However, the present invention can also be applied to a capacitance type pressure sensor for detecting a pressure applied from one direction. In this case, as in the sensor signal processing circuit shown in FIG. 1, the switches 12a to 12d of the switching section 12 are ON/OFF-controlled in the manner indicated by Table 1.

(Eighth Embodiment)

In the first embodiment, the method of obtaining $-\Delta d/d$ by using computation 1) below in the capacitance type pressure sensor having the sensor section 14 in FIG. 1 has been described. However, the method of computing $-\Delta d/d$ is not limited to this, and $-\Delta d/d$ can be obtained by using one of computations 2) to 4) below.

$$[C_s - C_r]/[C_s] = -\Delta d/d \tag{1}$$

$$1 - [C_r]/[C_s] = -\Delta d/d \tag{2}$$

$$1 - 1/([C_s - C_r]/[C_r] + 1) = -\Delta d/d \tag{3}$$

$$2 - 2/([C_s - C_r]/[C_s + C_r] + 1) = -\Delta d/d \tag{4}$$

In this case, the contents in "[ ]" represent data.
Computations 2) to 4) will be described below.
Computation 2) will be described first.
FIG. 15 shows a sensor signal processing circuit for performing this computation. The same reference numerals as in FIG. 1 denote the same parts in FIG. 15, and a description thereof will be omitted. The sensor signal processing circuit shown in FIG. 15 uses a switching section 12" having a switch 12f for connecting the input side of a sensor capacitor 14a to ground, in addition to switches 12a to 12e.

In order to perform computation 2), a CPU 17 sequentially outputs signals s11 to s41 as control signals 18 which ON/OFF-control the switches 12a to 12f of the switching section 12" in the manner indicated by Table 3. In this case, the noninverting input terminal (+) of a buffer 13a is connected to ground by turning on the switch 12f using the signals s11 and s21. This prevents the noninverting input terminal (+) of the buffer 13a from floating. Likewise, the noninverting input terminal (+) of a buffer 13b can be prevented from floating by turning on the switch 12e using signals s31 and s41.

TABLE 3

|  | Switch 12a | Switch 12b | Switch 12c | Switch 12d | Switch 12e | Switch 12f |
|---|---|---|---|---|---|---|
| Signal s11 | off | off | on | off | off | on |
| Signal s21 | off | on | off | off | off | on |
| Signal s31 | on | off | off | off | on | off |
| Signal s41 | off | off | off | on | on | off |

The following are output voltages $V_{11}$ to $V_{41}$ from an amplifying section 15 when the signals s11 to s41 are supplied to the switching section 12" in consideration of errors $e_1$ to $e_3$ due to the offsets of the buffers 13a and 13b and operational amplifier 15a.

$$V_{11} = -C_r(V_{i1} + e_2)/C_f + e_3 \tag{88}$$

$$V_{21} = -C_r(V_{i2} + e_2)/C_f + e_3 \tag{89}$$

$$V_{31} = -C_s(V_{i1} + e_1)/C_f + e_3 \tag{90}$$

$$V_{41} = -C_s(V_{i2} + e_1)/C_f + e_3 \tag{91}$$

If $1 - \{(V_{11} - V_{21})/(V_{31} - V_{41})\}$ is calculated from equations (88) to (91), then $$1 - \{(V_{11} - V_{21})/(V_{31} - V_{41})\} = 1 - [C_r]/[C_s] = -\Delta d/d \tag{92}$$

Thus, $-\Delta d/d$ can be obtained by computation 2).

In this case, as in the case of computation 1), circuit-based errors due to offsets and voltage variations are eliminated.
Computation 3) will be described next.

To perform computation 3), the CPU 17 sequentially outputs the signals s12 to s42 as the control signals 18 for ON/OFF-controlling the switches 12a to 12f of the switching section 12" in the manner indicated by Table 4. In this case, since one of AC power supplies 11a and 11b is always connected to the noninverting input terminal (+) of the buffer 13b, the switch 12e is not required.

TABLE 4

|  | Switch 12a | Switch 12b | Switch 12c | Switch 12d | Switch 12e | Switch 12f |
|---|---|---|---|---|---|---|
| Signal s12 | on | on | off | off | off | off |
| Signal s22 | off | off | on | on | off | off |

TABLE 4-continued

|  | Switch 12a | Switch 12b | Switch 12c | Switch 12d | Switch 12e | Switch 12f |
|---|---|---|---|---|---|---|
| Signal s32 | off | off | on | off | off | on |
| Signal s42 | off | on | off | off | off | on |

The following are output voltages $V_{12}$ to $V_{42}$ from the amplifying section 15 when the signals s12 to s42 are supplied to the switching section 12″ in consideration of errors $e_1$ to $e_3$ due to the offsets of the buffers 13a and 13b and operational amplifier 15a.

$$V_{12}=-[C_s(V_{i1}+e_1)+C_r(V_{i2}+e_2)]/C_f+e_3 \quad (93)$$

$$V_{22}=-[C_s(V_{i2}+e_1)+C_r(V_{i2}+e_2)]/C_f+e_3 \quad (94)$$

$$V_{32}=-C_r(V_{i1}+e_2)/C_f+e_3 \quad (95)$$

$$V_{42}=-C_r(V_{i2}+e_2)/C_f+e_3 \quad (96)$$

If $1-1/\{(V_{12}-V_{22})(V_{32}-V_{42})+1\}$ is calculated from equations (93) to (96), then $$1-1/\{(V_{12}-V_{22})/(V_{32}-V_{42})+1\}=1-1/([C_s-C_r]/[C_r]+1)=-\Delta d/d \quad (97)$$

Thus, $-\Delta d/d$ can be obtained by computation 3).

In this case, circuit-based errors due to offsets and voltage variations are eliminated.

Computation 4) will be described next.

To perform computation 4), the CPU 17 sequentially outputs the signals s13 to s43 as the control signals 18 for ON/OFF-controlling the switches 12a to 12f of the switching section 12″ in the manner indicated by Table 5. In this case, since one of AC power supplies 11a and 11b is always connected to the noninverting input terminals (+) of the buffers 13a and 13b, the switches 12e and 12f are not required.

TABLE 5

|  | Switch 12a | Switch 12b | Switch 12c | Switch 12d | Switch 12e | Switch 12f |
|---|---|---|---|---|---|---|
| Signal s13 | on | on | off | off | off | off |
| Signal s23 | off | off | on | on | off | off |
| Signal s33 | on | off | on | off | off | off |
| Signal s43 | off | on | off | on | off | off |

The following are output voltages $V_{13}$ to $V_{43}$ from the amplifying section 15 when the signals s13 to s43 are supplied to the switching section 12″ in consideration of errors $e_1$ to $e_3$ due to the offsets of the buffers 13a and 13b and operational amplifier 15a.

$$V_{13}=-[C_s(V_{i1}+e_1)+C_r(V_{i2}+e_2)]/C_f+e_3 \quad (98)$$

$$V_{23}=-[C_s(V_{i2}+e_1)+C_r(V_{i1}+e_2)]/C_f+e_3 \quad (99)$$

$$V_{33}=-[C_s(V_{i1}+e_1)+C_r(V_{i1}+e_2)]/C_f+e_3$$

$$V_{43}=-[C_s(V_{i2}+e_1)+C_r(V_{i2}+e_2)]/C_f+e_3 \quad (101)$$

If $2-2/\{(V_{13}-V_{23})/(V_{33}-V_{43})+1\}$ is calculated from equations (98) to (101), then $$2-2/\{(V_{13}-V_{23})/(V_{33}-V_{43})+1\}=2-2/([C_s-C_r]/[C_s+C_r]+1)=-\Delta d/d \quad (102)$$

Thus, $-\Delta d/d$ can be obtained by computation 4).

In this case, circuit-based errors due to offsets and voltage variations are eliminated.

Although identical results can be theoretically obtained by computations 1) to 4), there are some differences between the results in practice.

The capacitance $C_s$ of the sensor capacitor 14a mainly changes with a change in pressure P. In contrast to this, the capacitance $C_r$ of the reference capacitor 14b does not change with a change in pressure P and is influenced by only temperature, humidity, and the like. In this case, the pressure P varies much faster than temperature, humidity, and the like. For this reason, the capacitance $C_s$ that changes with a change in pressure P must always be measured. However, the capacitance $C_r$ that does not change with a change in pressure P need not always be measured.

In computations 1) and 4), measurements in all the four quadrants (equations (8) to (11), equations (98) to (101)) include the capacitance $C_s$ and hence must always be performed.

In contrast to this, in computations 2) and 3), measurements in two quadrants (equations (88) and (89), equations (95) and (96)) of the four quadrants do not include the capacitance $C_s$. Therefore, it suffices if measurements in the two quadrants (equations (90) and (91), equations (93) and (94)) that include the capacitance $C_s$ are always performed, whereas measurements in the two quadrants that do not include the capacitance $C_s$ are performed from time to time as needed.

In addition, there are some differences between quantization errors in A/D conversion among computations 1) to 4). Although not described in detail, the ranking of computations, from highest to lowest, in terms of quantization noise, is 3), 4), 1), and 2).

In each embodiment described above, the present invention is applied to the pressure sensor. However, the present invention can be applied to sensors for measuring various physical quantities such as temperature, humidity, displacement, variate, and acceleration.

In each embodiment described above, sections other than the sensor section, e.g., the synchronous detection section 60 (FIGS. 11 and 13) and sync signal generating circuit 61 (FIGS. 12 and 14) may be formed by firmware. In this case, the CPU 17 may perform synchronous detection processing and sync signal generation processing.

As has been described above, according to the present invention, outputs from the power supplies of the two systems are switched and applied to the sensor section, and the ratio between the differences between a plurality of signals output from the sensor section for every switching operation is obtained. This makes it possible to obtain a measurement result from which both circuit- and element-based errors are eliminated, thus improving the measurement precision of the sensor.

If the sensor section is formed by using reactance-based sensor element and the power supply section is comprised of AC power supplies of two systems, the resultant structure can be applied to a capacitance type sensor and inductance type sensor. If the sensor section is formed by using a resistance-based sensor element and the power supply section is comprised of DC power supplies of two systems, the resultant structure can be applied to a resistance type sensor.

In addition, except when power supplies having different polarities are connected to two sensor elements, the duty ratio of the switching section is decreased to shorten the time during which a power supply is connected to the sensor section, and an output from the sensor section is supplied to the A/D converter after it is passed through the integration means, thereby decreasing the input level of the A/D converter. This allows high-resolution A/D conversion regardless of the connected state between the power supplies and the sensor elements, and hence makes it possible to obtain an accurate measurement result.

Furthermore, since output signals from the sensor section are integrated in a predetermined interval in synchronism with an output from one power supply, even if a parallel resistor is produced in the reactance-based sensor element, a parallel resistor component can be eliminated. Therefore, a measurement result from which both circuit- and element-based errors are eliminated can be obtained by arithmetically processing the signal obtained by integrating the output signal from the sensor section in the above manner. This makes it possible to improve the measurement precision of the sensor.

Moreover, the amplifying section has a resistor for connecting the input side to the output side of the amplifying section, and a phase shifting section for compensating for a phase shift caused by the resistor is connected to the output stage of the amplifying section. In this arrangement, an output signal from the phase shifting section is integrated. With this operation, even if a parasitic resistance is produced in the reactance-based sensor element, a parasitic resistance component can be eliminated.

What is claimed is:

1. A sensor signal processing apparatus comprising:
   sensor means whose characteristics change in accordance with a change in physical quantity to be measured, wherein said sensor means comprises two sensor elements;
   power supply means for supplying powers of two systems having different polarities to said sensor means;
   switching means, connected between said power supply means and said sensor means, for sequentially switching four combinations of connections between powers of the two systems from said power supply means and said sensor elements while preventing mixing of powers of the two systems such that first to fourth signals are output from the sensor elements, wherein each of the first to fourth signals correspond to one of the four combinations of connections of said switching means; and
   arithmetic means for obtaining a first difference between the first and second signals output from said sensor elements, and a second difference between the third and fourth signals output from said sensor elements, and then obtains a ratio between the first and second differences to substantially eliminate at least one of a circuit-based error and an element-based error.

2. An apparatus according to claim 1, further comprising amplifying means for amplifying an output signal from said sensor means and outputting the signal to said arithmetic means.

3. An apparatus according to claim 1, wherein
   said sensor elements comprise a capacitance-based sensor element, and
   said power supply means comprises AC power supplies of two systems.

4. An apparatus according to claim 3, further comprising synchronous detection means for obtaining an integrated value of an output signal from said sensor means during one period of an AC component from one of said AC power supplies of said power supply means and outputting the integrated value to said arithmetic means.

5. An apparatus according to claim 4, wherein said synchronous detection means comprises sync signal output means for detecting that an AC component from one of said AC power supplies of said power supply means becomes 0 and outputting a sync signal to said arithmetic means.

6. An apparatus according to claim 4, wherein
   said apparatus further comprises phase shifting means for shifting a phase of an output signal from said sensor means and outputting the signal to said synchronous detection means,
   said amplifying means comprises an operational amplifier and a resistor connected between input and output terminals of said operational amplifier, and
   a phase shift amount of said phase shifting means is set to compensate for an amount of phase shift caused by the resistor.

7. An apparatus according to claim 1, wherein
   said sensor elements comprise a resistance-based sensor element, and
   said power supply means comprises DC power supplies of two system having different polarities.

8. An apparatus according to claim 7, wherein
   said switching means is set such that a ratio of an operation time during which power is commonly supplied from one of said DC power supplies of said power supply means to said two sensor elements to an operation time during which powers are separately supplied from said two DC power supplies of said power supply means to said two sensor elements becomes 1/n (n>1).

9. An apparatus according to claim 8, wherein
   said apparatus further comprises
      integration means for integrating an output signal from said sensor means, and
      analog-to-digital (A/D) conversion means for performing A/D conversion of an output from said integration means, and
   said arithmetic means performs arithmetic processing by multiplying an output from said A/D conversion means by n when power is commonly supplied from one of said DC power supplies of said power supply means to said two sensor elements.

10. An apparatus according to claim 1, wherein said two sensor elements comprise
   a first sensor element whose characteristics change in accordance with a change in physical quantity to be measured, and
   a second sensor element exhibiting constant characteristics regardless of a change in physical quantity to be measured.

11. An apparatus according to claim 1, wherein said two sensor elements comprise
   a first sensor element whose characteristics change in accordance with a difference between first and second physical quantities to be measured, and
   a second sensor element whose characteristics change in a direction opposite to that of said first sensor element in accordance with the difference between the first and second physical quantities to be measured.

12. An apparatus according to claim 1, wherein said switching means comprises first to fourth switches constituting a 2-input/2-output bridge circuit.

13. An apparatus according to claim 1, wherein said switching means comprises a fifth switch for grounding one of the two outputs of said bridge circuit.

14. An apparatus according to claim 1, wherein
said arithmetic means performs switching operation by outputting a control signal to said switching means, and performs arithmetic processing every time a control signal is output, and
said switching means sequentially performs switching operation in accordance with a control signal from said arithmetic means.

15. A sensor signal processing apparatus comprising:
sensor means whose characteristics change in accordance with a change in physical quantity to be measures, said sensor means comprising a first and second sensor element;
power supply means for supplying powers of a first and second system having different polarities to said sensor;
switching means for switching first to fourth combinations of connections between said first/second system and said first/second sensor elements; and
arithmetic means for obtaining a ratio of two differences based on four signals output from said sensor means for every switching operation of said switching means corresponding to the first and fourth combinations,
wherein power of the first system is supplied to the first sensor element and power of the second system is supplied the second sensor element in the first combination,
wherein power of the first system is supplied to the second sensor element and power of the second system is supplied to the first sensor element in the second combination,
wherein power of the first system is supplied to the first sensor element in the third combination, and
wherein power of the second system is supplied to the first sensor element in the fourth combination.

16. An apparatus according to claim 15, wherein the first sensor element is a sensing sensor element, and the second sensor element is a reference sensor element.

* * * * *